(12) United States Patent
Hu et al.

(10) Patent No.: US 12,529,187 B2
(45) Date of Patent: Jan. 20, 2026

(54) BAMBOO STRUCTURES, AND METHODS FOR FABRICATION AND USE THEREOF

(71) Applicant: UNIVERSITY OF MARYLAND, COLLEGE PARK, College Park, MD (US)

(72) Inventors: Liangbing Hu, Potomac, MD (US); Chaoji Chen, Greenbelt, MD (US); Zhihan Li, College Park, MD (US); Jiaqi Dai, Washington, DC (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 584 days.

(21) Appl. No.: 17/778,690

(22) PCT Filed: Nov. 25, 2020

(86) PCT No.: PCT/US2020/062259
§ 371 (c)(1),
(2) Date: May 20, 2022

(87) PCT Pub. No.: WO2021/108576
PCT Pub. Date: Jun. 3, 2021

(65) Prior Publication Data
US 2022/0412002 A1 Dec. 29, 2022

Related U.S. Application Data

(60) Provisional application No. 62/940,738, filed on Nov. 26, 2019.

(51) Int. Cl.
*D21C 5/02* (2006.01)
*B27K 9/00* (2006.01)
(Continued)

(52) U.S. Cl.
CPC .............. *D21C 5/022* (2013.01); *B27K 9/007* (2013.01); *D21C 9/007* (2013.01); *E04C 3/16* (2013.01); *E04C 3/29* (2013.01)

(58) Field of Classification Search
CPC .................................. D21C 5/022; E04C 3/29
See application file for complete search history.

(56) References Cited

U.S. PATENT DOCUMENTS

| 11,130,256 B2 | 9/2021 | Hu et al. |
| 11,440,214 B2 | 9/2022 | Hu et al. |

(Continued)

FOREIGN PATENT DOCUMENTS

| WO | WO 2008/044860 A1 | 4/2008 |
| WO | WO 2009/056009 A1 | 5/2009 |

(Continued)

OTHER PUBLICATIONS

Li, Anisotropic, lightweight, strong, and superthermally insulating nanowood with naturally aligned nanaocellulose, 2018, Materials Science, pp. 1-9 (Year: 2018).*

(Continued)

*Primary Examiner* — Nahida Sultana
*Assistant Examiner* — Debjani Roy
(74) *Attorney, Agent, or Firm* — Rowan Tree Law Group, PLLC; Frederick F. Rosenberger

(57) ABSTRACT

Natural bamboo is chemically treated to remove at least some lignin therefrom. As a result, the bamboo becomes more porous and less rigid, while otherwise retaining the aligned microstructure of bamboo fibers and constituent cellulose nanofibers. In some embodiments, the treated bamboo can then be pressed such that the lumina therein at least partially collapse, thereby improving the strength and toughness of the bamboo among other properties. In some embodiments, the treated bamboo can be infiltrated with a (Continued)

polymer or polymer precursor, and/or have non-native particles added to surfaces thereof to tailor properties of the resulting bamboo structure. By further modifying, manipulating, or machining the treated bamboo, it can be adapted to various applications.

20 Claims, 12 Drawing Sheets

(51) Int. Cl.
   *D21C 9/00* (2006.01)
   *E04C 3/16* (2006.01)
   *E04C 3/29* (2006.01)

(56) References Cited

U.S. PATENT DOCUMENTS

| | | | |
|---|---|---|---|
| 11,958,209 | B2 | 4/2024 | Hu et al. |
| 2004/0145078 | A1* | 7/2004 | Merkley ............... C04B 28/02 264/236 |
| 2012/0180964 | A1 | 7/2012 | Heinricher |
| 2015/0204017 | A1* | 7/2015 | Nelson ...................... C12P 7/14 435/165 |
| 2017/0073852 | A1 | 3/2017 | Uno et al. |
| 2019/0112764 | A1 | 4/2019 | Banu et al. |
| 2020/0238565 | A1* | 7/2020 | Hu ........................... B27K 5/02 |
| 2021/0122902 | A1 | 4/2021 | Hu et al. |
| 2022/0040881 | A1* | 2/2022 | Hu ........................... B27K 5/04 |

FOREIGN PATENT DOCUMENTS

| | | | | |
|---|---|---|---|---|
| WO | WO-2018191181 | A1 * | 10/2018 | ......... B01D 11/0288 |
| WO | WO 2019/055789 | A1 | 3/2019 | |

OTHER PUBLICATIONS

Burgert, Bio-inspired functional wood-based materials—hybrids and replicates, pp. 431-450 (Year: 2015).*

Agrawal et al., "Activation energy and crystallization kinetics of untreated and treated oil palm fibre reinforced phenol formaldehyde composites," *Materials Science and Engineering*, 2000, A277: pp. 77-82. (6 pages).

Chen et al., "Rapid Processing of Whole Bamboo with Exposed, Aligned Nanofibrils toward a High-Performance Structural Material," *ACS Nano*, Apr. 2020, 14: pp. 5194-5202. (9 pages).

Dixon et al., "Comparison of the flexural behavior of natural and thermo-hydromechanically densified Moso bamboo," *Eur. J. Wood. Prod.*, Apr. 2016, 74: pp. 633-642. (10 pages).

Gan et al., "Single-digit-micrometer thickness wood speaker," *Nature Communications*, Nov. 2019, 10: paper No. 5084. (8 pages).

Kalali et al., "Highly-aligned cellulose fibers reinforced epoxy composites derived from bulk natural bamboo," *Industrial Crops & Products*, 2019 (available online Dec. 2018), 129: pp. 434-439. (6 pages).

Kumar et al., "Engineered bamboo scrimber: Influence of density on the mechanical and water absorption properties," *Construction and Building Materials*, Oct. 2016, 127: pp. 815-827. (13 pages).

Osorio et al., "In-depth study of the microstructure of bamboo fibres and their relation to the mechanical properties," *Journal of Reinforced Plastics & Composites*, Jun. 2018, 37(17): pp. 1099-1113. (15 pages).

Park, Choong Nyeon, "Flattening of Bamboo by Thermo mechanical Treatment," *10th World Bamboo Congress, Korea 2015*, 2015. (7 pages).

Sharma et al., "Effect of processing methods on the mechanical properties of engineered bamboo," *Construction and Building Materials*, Mar. 2015, 83: pp. 95-101. (7 pages).

Sharma et al., "Engineered bamboo for structural applications," *Construction and Building Materials*, Feb. 2015, 81: pp. 66-73. (8 pages).

Valadez-Gonzalez et al., "Chemical modification of henequen fibers with an organosilane coupling agent," *Composites: Part B*, 1999, pp. 321-331. (11 pages).

Yang et al., "Effects of different thermal modification media on physical and mechanical properties of moso bamboo," *Construction and Building Materials*, May 2016, 119: pp. 251-259. (9 pages).

International Search Report and Written Opinion, mailed Feb. 11, 2021, in International Application No. PCT/US2020/062259. (13 pages).

* cited by examiner

BAMBOO STRUCTURES, AND METHODS FOR FABRICATION AND USE THEREOF

CROSS REFERENCE TO RELATED APPLICATION

The present application claims the benefit of U.S. Provisional Application No. 62/940,738, filed Nov. 26, 2019, entitled "Methods for Processing Bamboo and Wood and the Uses of the Same," which is incorporated by reference herein in its entirety.

STATEMENT REGARDING FEDERALLY SPONSORED RESEARCH

This invention was made with government support under DE-AR0001025 awarded by the U.S. Department of Energy. The government has certain rights in the invention.

FIELD

The present disclosure relates generally to bamboo structures, and more particularly, to modification of natural bamboo to remove at least some lignin therefrom, as well as structures and devices incorporating such modified bamboo.

SUMMARY

Embodiments of the disclosed subject matter provide bamboo structures formed by subjecting natural bamboo to one or more chemical treatments to remove at least some lignin therefrom. As a result, the bamboo can become more porous and less rigid, while otherwise retaining the aligned microstructure of bamboo fibers and constituent cellulose nanofibers. In some embodiments, the treated bamboo can then be pressed in a direction crossing the direction in which its lumina extend (i.e., having a force component perpendicular to the direction in which the lumina extend), such that the lumina therein at least partially collapse. As a result, the cell walls become entangled and hydrogen bonds are formed between adjacent cellulose nanofibers, thereby improving the strength and toughness of the bamboo among other mechanical properties. In some embodiments, the treated bamboo can be infiltrated with a polymer or polymer precursor, and/or have non-native particles added to surfaces thereof to tailor properties of the resulting bamboo structure.

By further modifying, manipulating, or machining the treated bamboo, it can be adapted to various applications. In some embodiments, the treated bamboo can be twisted onto itself to form a fiber or rope. In some embodiments, the treated bamboo can be formed into any number of geometric shapes and adapted for use as a structural or reinforcing material, and/to perform a desired function (e.g., filtration membrane, speaker diaphragm, etc.). For example, in some embodiments, the treated bamboo can be incorporated into a base material, such as concrete or polymer, to form a composite structure with improved properties.

In a representative embodiment, a method can comprise removing at least some lignin from a segment of bamboo via one or more chemical treatments.

In another representative embodiment, a structure can comprise a segment comprising bamboo that has been chemically-treated to remove at least some naturally-occurring lignin therefrom.

In another representative embodiment, a method can comprise removing at least some lignin from a plurality of segments of bamboo via one or more chemical treatments. The method can further comprise pressing each chemically-treated segment of bamboo in a direction crossing a longitudinal direction of the respective segment, such that natural lumina originally in the respective segment at least partially collapse. The method can also comprise embedding the plurality of pressed, chemically-treated segments of bamboo within a base material to form a composite.

In another representative embodiment, a structure can comprise a base material and a plurality of segments embedded within the base material. Each segment can comprise bamboo that has been chemically-treated to remove at least some naturally-occurring lignin therefrom and having natural lumina therein that are at least partially collapsed.

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description.

BRIEF DESCRIPTION OF THE DRAWINGS

The following description will proceed with reference to the accompanying drawings, which have not necessarily been drawn to scale. Where applicable, some elements may be simplified or otherwise not illustrated in order to assist in the illustration and description of underlying features. Throughout the drawings, like reference numerals denote like elements.

DETAILED DESCRIPTION

General Considerations

Figure 1A:
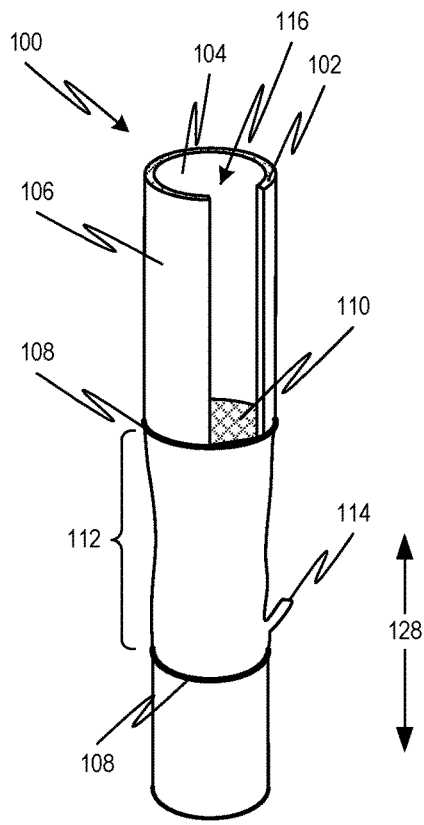
FIG. 1A is a simplified partial cut-away view of a natural bamboo segment.

For purposes of this description, certain aspects, advantages, and novel features of the embodiments of this disclosure are described herein. The disclosed methods, structures, and uses should not be construed as being limiting in any way. Instead, the present disclosure is directed toward all novel and nonobvious features and aspects of the various disclosed embodiments, alone and in various combinations and sub-combinations with one another. The methods, structures, and uses are not limited to any specific aspect or feature or combination thereof, nor do the disclosed embodiments require that any one or more specific advantages be present, or problems be solved. The technologies from any embodiment or example can be combined with the technologies described in any one or more of the other embodiments or examples. In view of the many possible embodiments to which the principles of the disclosed technology may be applied, it should be recognized that the illustrated embodiments are exemplary only and should not be taken as limiting the scope of the disclosed technology.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods, as known to those of ordinary skill in the art. When directly and explicitly distinguishing embodiments from discussed prior art, the embodiment numbers are not approximates unless the word "about" is recited. Whenever "substantially," "approximately," "about," or similar language is explicitly used in combination with a specific value, variations up to and including 10% of that value are intended, unless explicitly stated otherwise.

Directions and other relative references may be used to facilitate discussion of the drawings and principles herein, but are not intended to be limiting. For example, certain terms may be used such as "inside," "outside,", "top," "bottom," "interior," "exterior," "left," "right," "front," "back," "rear," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part and the object remains the same.

As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Introduction

FIG. 1A shows a partial cutaway view of a bamboo segment 100 in its naturally-occurring state. The segment 100 has a culm wall 102 surrounding a hollow interior region 116, which is divided along a length of the culm wall 102 into internal nodal regions 112 by nodes 108 formed by an internal nodal diaphragm 110. The culm wall 102 has fibers extending along a longitudinal direction 128 (e.g., bamboo growth direction or a direction substantially parallel to an axis defined by the hollow interior region 116) of the bamboo segment 100) thar are embedded in a lignin matrix. One or more branch stubs 114 can extend from a particular internal nodal region 112 and can serve as the root from which a culm wall for a new bamboo segment may grow (e.g., thus defining a different longitudinal direction for the new segment).

Figure 1B:
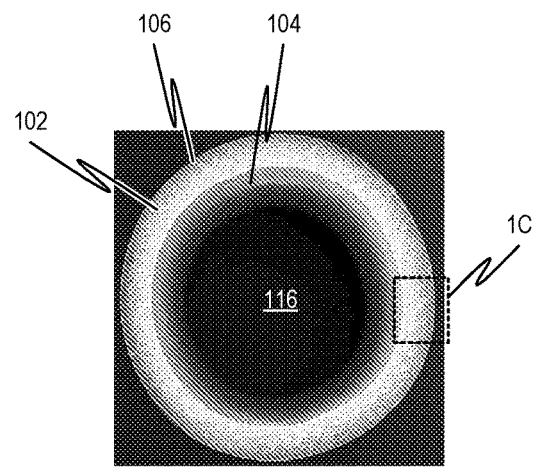
FIG. 1B is a top view image of a cross-section of a natural bamboo segment.
Figure 1C:
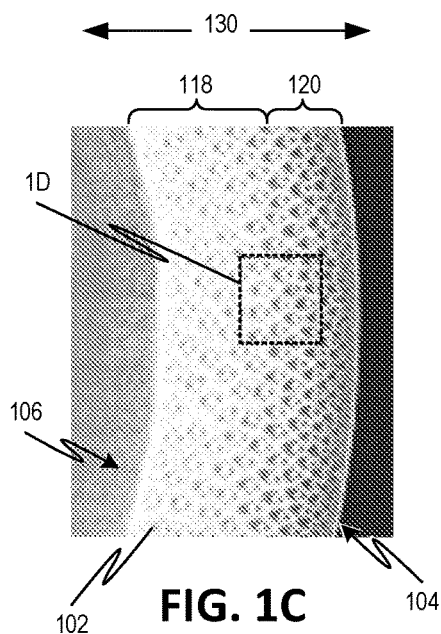
FIG. 1C is a magnified image of the culm of the natural bamboo segment of FIG. 1B.
Figure 1D:
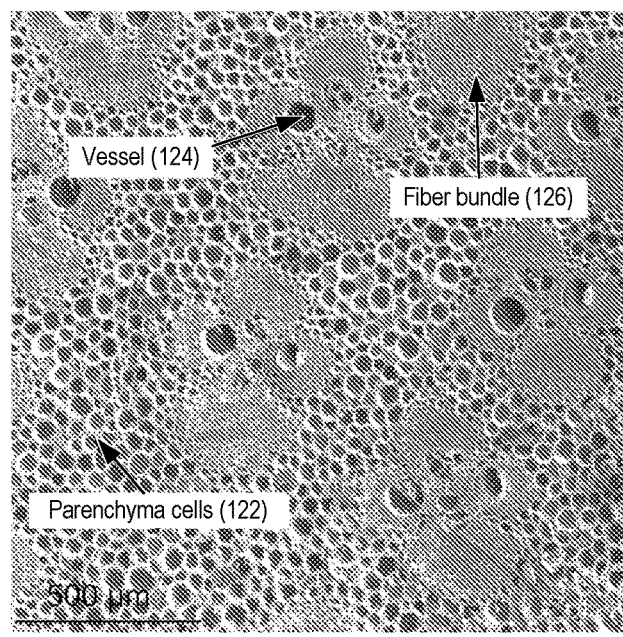
FIG. 1D is a further magnified image showing the hierarchical microstructure of the culm wall of FIG. 1C.

Within the culm wall 102, the bamboo exhibits a hierarchical cellular structure with porous cells that provide nutrient transport and dense cells that provide mechanical support. For example, FIGS. 1B-D show images of a cross-section of a bamboo segment 100, in particular, illustrating the microstructure of parenchyma cells 122, vessels 124, and fiber bundles 126 that constitute the culm wall 102. The fiber bundles 126 are highly aligned and extend substantially parallel to the longitudinal direction 128 whereas parenchyma cells 122 can be parallel or perpendicular to the longitudinal direction 128. The density of the fiber bundles 126 can increase along the radial direction 130, such that an outer portion 120 of the bamboo 100 closest to the exterior wall 106 has different mechanical properties than an inner portion 118 of the bamboo closest to the interior wall 104.

Each vessel 124 defines an open lumen that extends along the longitudinal direction 128. Moreover, the elementary fibers that form the fiber bundles 126 may also have irregular small lumina in a center thereof. The fiber bundles 126, parenchyma cells 122, and vessels 124 adhere to each other via a low strength polymer matrix composed of lignin and hemicellulose. The native microstructure can also exhibit pit apertures on the longitudinal walls of fibers, porosity introduced by the parenchyma cells, and/or open intercellular space between adjacent fibers. Embodiments of the disclosed technology can modify bamboo and/or combine it with other materials in order to take advantage of its unique cellulose-based structure.

Figure 2:
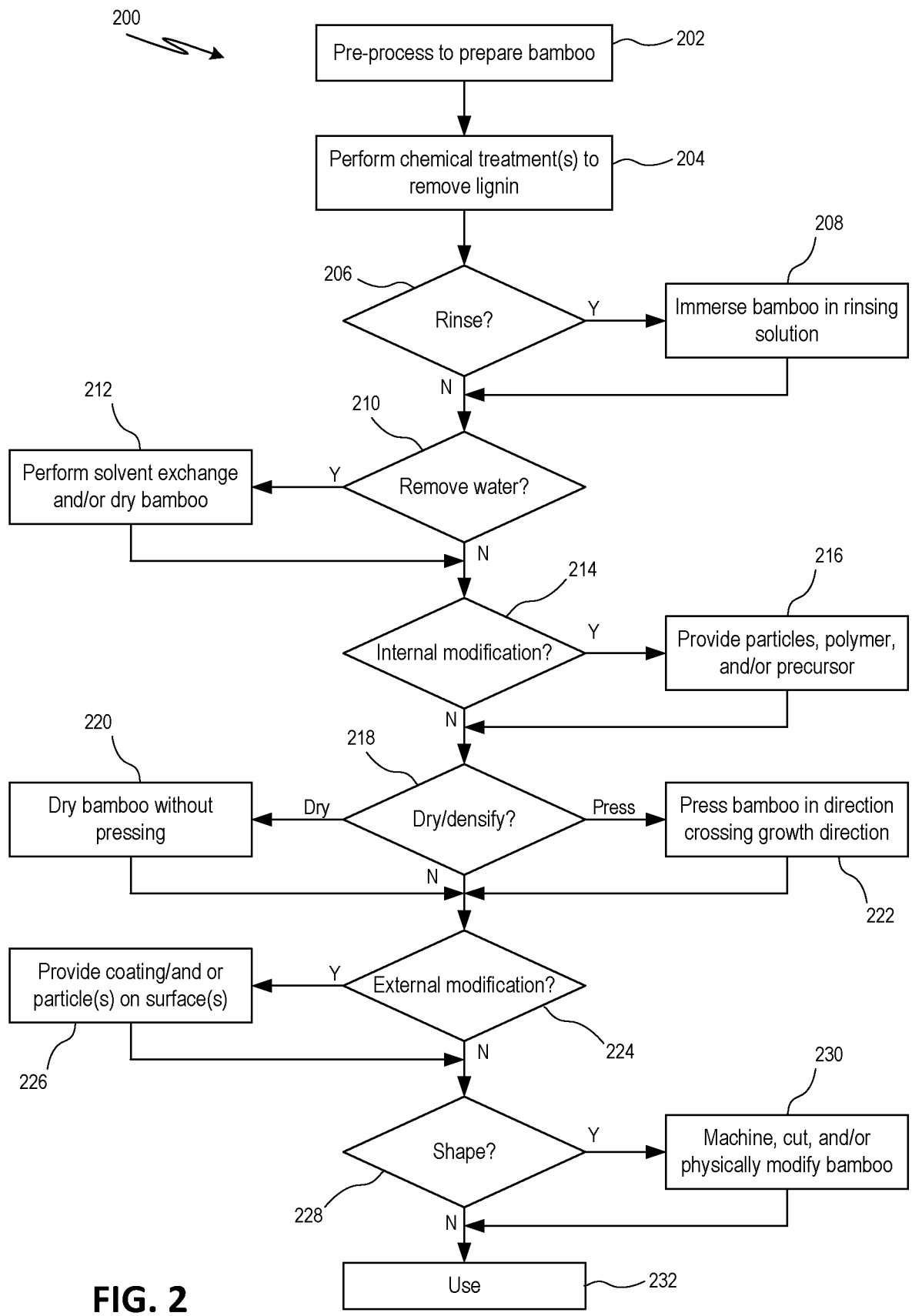
FIG. 2 is an exemplary process flow diagram for fabricating bamboo structures, according to one or more embodiments of the disclosed technology.

Referring to FIG. 2, a generalized method 200 for fabricating bamboo structures is shown. The method 200 can begin at process block 202, where a segment or section of naturally-occurring bamboo (e.g., a portion of bamboo after separation from its parent plant and therefore in its substantially native condition) is subject to optional pre-processing. The bamboo can be any type of Bambusoideae, such as but not limited to Moso, Phyllostachys Vivax, Phyllostachys Viridis, Phyllostachys Bambusoides, and Phyllostachys Nigra. In some embodiments, the pre-processing can include cleaning, for example, to remove any undesirable material or contamination in preparation for subsequent processing. In some embodiments, the pre-processing can also include forming the bamboo into a particular shape in preparation for subsequent processing.

For example, in some embodiments, the pre-processing can include forming the bamboo segment into a substantially flat sheet or block. For example, the culm wall of the bamboo segment can be split open by forming a slice or slot that extends along the longitudinal direction of the segment. The bamboo segment can then be softened and then pressed to flatten. In some embodiments, the softening is performed by exposing the bamboo segment to steam, for example, steam at a temperature above 130° C. (e.g., 160-180° C., inclusive) and at a pressure above ambient (e.g., 6-10 bar, inclusive) for at least one minute (e.g., ~8-10 minutes, inclusive). In some embodiments, the flattening is performed by pressing the bamboo segment while it is still soft, for example, using a horizontal press or roller press to apply a pressure (e.g., ~150 kg/cm$^2$) for at least one minute (e.g., ~2-8 minutes, inclusive). In some embodiments, the pre-processing can include removing the internal nodal diaphragm (for example, prior to or after the splitting open of the culm wall). Alternatively, in some embodiments, the pre-processing includes cutting the bamboo to exclude the nodes from use, for example, to use only the internodal portion.

Alternatively or additionally, in some embodiments, the pre-processing can include forming a plurality of bamboo pieces from a particular naturally-occurring bamboo segment, for example, by slicing through culm wall to for individual bamboo strips. In some embodiments, the strips may be formed one at a time or simultaneously (e.g., by using a dicing or fluffing machine). In some embodiments, the strips may also be softened and/or flattened, for example, as described above. Alternatively or additionally, in some embodiments, the pre-processing can cut or otherwise form the naturally-occurring bamboo segment into other shapes than the strips or flat plate described above. Alternatively, in some embodiments, the bamboo segment is maintained with its natural, unmodified shape for further processing.

After any pre-processing at process block 202, the method 200 can proceed to process block 204, where the bamboo segment is subject to one or more chemical treatments in order to remove at least some lignin therefrom, for example, by immersion of the segment (or a portion thereof) in a chemical solution associated with the treatment. In some embodiments, each chemical treatment or only some chemical treatments can be performed under vacuum, such that the solution associated with the treatment is encouraged to fully penetrate the cell walls and lumina of the bamboo segment. Alternatively, in some embodiments, the chemical treatment(s) can be performed under ambient pressure conditions or elevated pressure conditions (e.g., ~6-8 bar). In some embodiments, each chemical treatment or some chemical treatments can be performed at any temperature between ambient (e.g., ~23° C.) and an elevated temperature where the solution associated with the chemical treatment is boiling (e.g., ~160° C.). In some embodiments, the solution is not agitated in order to minimize the amount of disruption to the microstructure of the bamboo, whereas in other embodiments the solution may be agitated (e.g., via stirring) to encourage such disruption.

In some embodiments, the immersion time can range anywhere from 0.1 hours to 72 hours, for example, between 4 hours and 12 hours, inclusive. The amount of time of immersion within the solution may be a function of amount of lignin to be removed, size of the segment, temperature of the solution, pressure of the treatment, and/or agitation. For example, smaller amounts of lignin removal, smaller segment size, higher solution temperature, higher treatment pressure, and agitation may be associated with shorter immersion times, while larger amounts of lignin removal, larger segment size, lower solution temperature, lower treatment pressure, and no agitation may be associated with longer immersion times.

The chemical treatment can thus continue (or can be repeated with subsequent solutions) until a desired reduction in the amount of lignin in the bamboo segment is achieved. The amount of lignin removed from the bamboo segment, on a dry weight basis, can between 0.1% (99.9% of lignin originally in the segment is retained) and 100% (all of the lignin originally in the segment is removed), depending upon the desired application. For example, in some embodiments where it may be desirable to retain as much of the original bamboo structure as possible, the amount of lignin removed can be small, such as less than 10% of the original lignin content is removed (e.g., 5-10% lignin removed). In another example, in some embodiments where retaining the original bamboo structure is less desirable, greater amounts of lignin can be removed, such as greater than 80% of the original lignin content is removed (e.g., 80-90% lignin removed). In still another example, the amount of lignin removed can be about 50% of the original lignin content. In some embodiments, the amount of lignin removed can be such that the final bamboo segment has less than 18 wt % lignin therein (e.g., 0-18 wt % lignin), whereas the initial untreated bamboo segment may have an original lignin content in excess of 18 wt % (e.g., 18-30 wt % lignin). In some embodiments, the amount of lignin in the bamboo after chemical treatment can be 0.18-24.75 wt %, inclusive. The amount of lignin within the bamboo segment after treatment can be determined using known techniques in the art, for example, Laboratory Analytical Procedure (LAP) TP-510-42618 for "Determination of Structural Carbohydrates and Lignin in Biomass," Version 08-03-2012, published by National Renewable Energy Laboratory (NREL), and ASTM E1758-01(2020) for "Standard Test Method for Determination of Carbohydrates in Biomass by High Performance Liquid Chromatography," published by ASTM International, both of which are incorporated herein by reference.

In some embodiments, the solution of the chemical treatment comprises an alkaline solution. In some embodiments, the solution of the chemical treatment can include sodium hydroxide (NaOH), lithium hydroxide (LiOH), potassium hydroxide (KOH), sodium sulfite ($Na_2SO_3$), sodium sulfate ($Na_2SO_4$), sodium sulfide ($Na_2S$), $Na_nS$ (where n is an integer), urea ($CH_4N_2O$), sodium bisulfite ($NaHSO_3$), sulfur dioxide ($SO_2$), anthraquinone (AQ) ($C_{14}H_8O_2$), methanol ($CH_3OH$), ethanol ($C_2H_5OH$), butanol ($C_4H_9OH$), formic acid ($CH_2O_2$), hydrogen peroxide ($H_2O_2$), acetic acid ($CH_3COOH$), butyric acid ($C_4H_8O_2$), peroxyformic acid ($CH_2O_3$), peroxyacetic acid ($C_2H_4O_3$), ammonia ($NH_3$), tosylic acid (p-TsOH), sodium hypochlorite (NaClO), sodium chlorite ($NaClO_2$), chlorine dioxide ($ClO_2$), chorine ($Cl_2$), or any combination of the above. Exemplary combinations of chemicals for the chemical treatment can include, but are not limited to, $NaOH+Na_2SO_3$, $NaOH+Na_2SO_4$, $NaOH+Na_2S$, NaOH+urea, $NaHSO_3+SO_2+H_2O$, $NaHSO_3+Na_2SO_3$, $NaOH+Na_2SO_3$, NaOH+AQ, $NaOH+Na_2S+AQ$, $NaHSO_3+SO_2+H_2O+AQ$, $NaOH+Na_2SO_3+AQ$, $NaHSO_3+AQ$, $NaHSO_3+Na_2SO_3+AQ$, $Na_2SO_3+AQ$, $NaOH+Na_2S+Na_nS$ (where n is an integer), $Na_2SO_3+NaOH+CH_3OH+AQ$, $C_2H_5OH+NaOH$, $CH_3OH+HCOOH$, $NH_3+H_2O$, and $NaClO_2$+ acetic acid.

In some embodiments, a first chemical treatment can be performed on the bamboo segment using a mixture of NaOH and $Na_2SO_3$, for example, a boiling solution of 2.5M NaOH and 0.4M $Na_2SO_3$. In some embodiments, the first chemical treatment can employ a solution of 0.5M NaOH and 0.02M $Na_2SO_3$ within a reaction chamber at an elevated pressure (e.g., ~6-8 bar, inclusive) and/or an elevated temperature (e.g., 160° C.) for about 1 hour. In some embodiments, a second chemical treatment can be performed on the bamboo segment after the first chemical treatment. In some embodiments, the second chemical treatment can be a bleaching solution, for example, a boiling solution of 2.5M $H_2O_2$.

Once sufficient lignin has been removed by the chemical treatment(s), the method 200 can proceed to decision block 206, where it is determined if optional rinsing should be performed. If rinsing is desired, the method 200 can proceed to process block 208, where the treated bamboo segment is immersed in one or more rinsing solutions. The rinsing solution can be a solvent, such as but not limited to, de-ionized (DI) water. In some embodiments, the solvent may be at an elevated temperature, such as boiling. The rinsing can be effective to remove any remnants of the chemical solution within the treated piece of bamboo and/or any components of the bamboo dislodged by the treatment. Alternatively, in some embodiments, it may be desirable to retain the dislodged components of the bamboo, in which case the rinsing can be omitted.

The method 200 can proceed from decision block 206 or process block 208 to decision block 210, where it is determined if optional water removal should be performed. In some embodiments, it may be desirable to remove water to prepare for or improve subsequent internal modification of the bamboo, for example, to improve polymer impregnation and/or promote interfacial adhesion. If water removal is desired, the method 200 can proceed to process block 212, where the water is removed via drying or replacement. In some embodiments, the water can be removed by performing a solvent exchange, for example, by immersing the bamboo segment in an alcohol (e.g., a boiling solution of ethanol). Alternatively or additionally, in some embodiments, the water can be removed by drying, for example, air drying, vacuum-assisted oven drying, microwave drying, freeze drying, critical point drying, or any combination thereof.

The method 200 can proceed from decision block 210 or process block 212 to decision block 214, where it is determined if an optional internal modification should be performed. If an internal modification is desired, the method 200 can proceed to process block 216, where the chemically-treated bamboo is subjected to the internal modification. Although the term "internal" is used to refer to the modification of process block 212, it is contemplated that, in some embodiments, the modification may be applied to external features as well as internal features of the bamboo segment, while in other embodiments the modification may be applied to either internal features or external features of the bamboo segment without otherwise affecting the other feature.

In some embodiments, the internal modification can include forming, depositing, or otherwise providing non-native particles on surfaces of the chemically-treated bamboo. Such surfaces can include at least internal surfaces, e.g., cell walls lining the lumina, but may also include external surfaces of the bamboo. The non-native particles incorporated onto the surfaces of the bamboo can imbue the final structure with certain advantageous properties, such as hydrophobicity, weatherability, corrosion resistance (e.g., salt water resistant), and/or flame resistance among other properties. For example, in some embodiments, hydrophobic nanoparticles (e.g., $SiO_2$ nanoparticles) can be formed on surfaces of the chemically-treated bamboo.

Alternatively or additionally, in some embodiments, the internal modification can include performing a further chemical treatment that modifies the surface chemistry of the bamboo. For example, in some embodiments, the further chemical treatment can provide weatherability or corrosion resistance can include at least one of cupramate (CDDC), ammoniacal copper quaternary (ACQ), chromated copper arsenate (CCA), ammoniacal copper zinc arsenate (ACZA), copper naphthenate, acid copper chromate, copper citrate, copper azole, copper 8-hydroxyquinolate, pentachlorophenol, zinc naphthenate, copper naphthenate, kreosote, titanium dioxide, propiconazole, tebuconazole, cyproconazole, boric acid, borax, organic iodide (IPBC), and $Na_2B_8O_{13} \cdot 4H_2O$.

Alternatively or additionally, in some embodiments, the internal modification of process block 216 can include infiltrating the chemically treated bamboo with one or more polymers (or polymer precursors). For example, the chemically-treated bamboo can be immersed in a polymer solution under vacuum to form a hybrid material. The prior chemical treatment of the bamboo can yield pores of 100 nm to 500 μm (e.g., 100 nm to 100 μm), and the immersion can be such that the pores are filled with the polymer solution. The polymer can be any type of polymer capable of infiltrating into the pores of the bamboo, for example, a synthetic polymer, a natural polymer, a thermosetting polymer, or a thermoplastic polymer.

For example, in some embodiments, the polymer can be epoxy resin, polyvinyl alcohol (PVA), polyethylene glycol (PEO), polyamide (PA), polyethylene terephthalate (PET), polybutylene terephthalate (PBT), polytrimethylene terephthalate (PTT), polyacrylonitrile (PAN), polycaprolactam (PA6), poly(m-phenylene isophthalamide) (PMIA), poly-p-phenylene terephthalamide (PPTA), polyurethane (PU), polycarbonate (PC), polypropylene (PP), high-density polyethylene (HDPE), polystyrene (PS), polycaprolactone (PCL), polybutylene succinate (PBS), polybutylene adipate terephthalate (PBAT), poly(butylene succinate-co-butylene adipate) (PBSA), polyhydroxybutyrate (PHB), poly(3-hydroxybutyrate-co-3-hydroxyvalerate) (PHBV), poly(glycolic acid) (PGA), polypyrrole (PPy), polythiophene (PTh), polyvinylidene fluoride (PVDF), polyvinyl fluoride (PVF), ethylene vinyl alcohol (EVOH), poly(vinylidene chloride) (PVDC), polyxylylene adipamide (MXD6), polyethylene (PE), polyvinyl chloride (PVC), poly(methyl methacrylate) (PMMA), acrylonitrile butadiene styrene (ABS), polyimide (PI), polyethylenimine (PEI), polylactic acid (PLA), octadecyltrichlorosilane (OTS), polyoctahedral silsesquioxane (POSS), paramethylstyrene (PMS), polydimethylsiloxane (PDMS), poly(ethylene naphthalate) (PEN), a graft copolymer of acrylonitrile-butadiene-styrene-methylmethacrylate (ABSM), dodecyltrimethoxysilane (DTMS), rosin, chitin, chitosan, protain, plant oil, lignin, hemicellulose, carboxymethyle cellulose, cellulose acetate, starch, agar, or any combination of the above.

In some embodiments, the polymer infiltrating the chemically-treated bamboo comprises rosin. At the molecular level, rosin can act as a "molecular glue" with respect to cellulose microfibers of the bamboo culm. Rosin can also provide carboxyl groups that can form strong hydrogen bonds with abundant hydroxyl groups in cellulose chains and that can improve the strength and toughness in densified bamboo structures. For example, a densified bamboo structure can be formed with 20 wt % rosin.

The method 200 can proceed from decision block 214 or process block 216 to decision block 218, where it is determined if an optional drying and/or densification should be performed, and if so, whether drying or pressing should be performed. In some embodiments, the pressing is effective to reduce an amount of water or any other fluid retained therein, thereby effectively densifying and drying the bamboo at the same time. Alternatively, in some embodiments, the pressing merely results in densification, for example, when the bamboo segment has already been dried or has a sufficiently low water or fluid content, or when the pressing is performed at a low temperature (e.g., cold pressing at room temperature). In some embodiments, drying without pressing causes shrinkage of the bamboo segment, thereby effectively providing drying and partial densification at the same time. Alternatively, in some embodiments, the drying merely results in a reduction in the amount of water or fluid retained therein without substantial densification.

For example, when it is desired to retain the original shape of the bamboo segment for the final fabricated product, pressing of the bamboo segment may be avoided. In such embodiments, or in any other embodiment where drying without pressing is desired, the method 200 can proceed to process block 220. At process block 220, the chemically-treated bamboo segment can be dried by any number of drying processes, such as but not limited to an air drying process, a vacuum-assisted drying process, an oven drying process, a freeze-drying process, a critical point drying process, a microwave drying process, or any combination of the above.

In some embodiments, the air drying process can include allowing the bamboo segment to naturally dry in static or moving air, which air may be at any temperature, such as room temperature (e.g., 23° C.) or at an elevated temperature (e.g., greater than 23° C.). In some embodiments, a vacuum-assisted drying process can include subjecting the bamboo segment to reduced pressure, e.g., less than 1 bar, for example, in a vacuum chamber or vacuum oven. In some embodiments, an oven drying process can include using an oven, hot plate, or other conductive or convective heating apparatus to heat the bamboo segment at an elevated temperature (e.g., greater than 23° C.), for example, 70° C. or greater.

In some embodiments, a freeze-drying process can include reducing a temperature of the bamboo segment to below a freezing point of the fluid therein (e.g., less than 0° C.), then reducing a pressure to allow the frozen fluid therein to sublime (e.g., less than a few millibars). In some embodiments, a critical point drying process can include immersing the bamboo segment in a fluid (e.g., liquid carbon dioxide), increasing a temperature and pressure of the bamboo segment past a critical point of the fluid (e.g., 7.39 MPa, 31.1° C. for carbon dioxide), and then gradually releasing the pressure to remove the now gaseous fluid.

In some embodiments, a microwave drying process can include using a microwave oven or other microwave generating apparatus to induce dielectric heating within the bamboo segment by exposing it to electromagnetic radiation having a frequency in the microwave regime (e.g., 300 MHz to 300 GHz), for example, a frequency of ~915 MHz or ~2.45 GHz. For example, the microwave oven can be operated a power of 2 kW, 4 kW, or 6 kW to heat the bamboo segment to a temperature of 70° C., 80° C., and 90° C., respectively. The heating induced by the microwave exposure can rapidly evaporate water or other fluid within the bamboo segment, thereby resulting in a relatively short drying cycle (e.g., on the order of one minute to several minutes). For example, the microwave oven can be operated a power of 2 kW, 4 kW, or 6 kW to heat the bamboo segment to a temperature of 70° C., 80° C., and 90° C., respectively.

Alternatively, in embodiments where pressing is desired, the method 200 can proceed from decision block 218 to process block 222, where the chemically-treated bamboo is pressed in a direction crossing its longitudinal direction. In some embodiments, the pressing can be in a direction substantially perpendicular to the longitudinal direction, while in other embodiments the pressing may have a force component perpendicular to the longitudinal direction. In either case, the pressing can be effective reduce a thickness of the bamboo, thereby increasing its density as well as collapsing (at least partially) the natural lumina (e.g., vessels, lumen in each fiber, parenchyma cells, etc.), voids, and/or gaps within the cross-section of the bamboo.

In some embodiments, the pressing can be along a single direction (e.g., along radial direction 130), for example, to reduce a thickness of the culm wall of the bamboo segment (e.g., to a thickness as small as 10 μm or at least a 5:2 reduction in dimension as compared to the bamboo segment prior to pressing). Alternatively or additionally, in some embodiments, the bamboo segment can be simultaneously pressed in two directions (e.g., along radial direction 130 and a second direction perpendicular to both the radial direction 130 and the longitudinal direction 128), for example, to reduce a cross-sectional area of the bamboo segment (e.g., to produce a densified rectangular bar). Alternatively or additionally, in some embodiments, the bamboo segment can be sequentially pressed in different directions (e.g., first along radial direction 130 and then along a second direction perpendicular to the radial direction 130 and longitudinal direction 128).

In some embodiments, the pressing may be performed without any prior drying of the bamboo segment or at least with the bamboo segment retaining some water or fluid therein. The pressing can thus be effective to remove at least some water or other fluid from the chemically-treated bamboo at the same time as its dimension is reduced and density increased. In some embodiments, a separate drying process can be combined with the pressing process. For example, the bamboo may initially be pressed to cause densification and remove at least some water or fluid therefrom, followed by a drying process (e.g., air drying) to remove the remaining water or fluid. In some embodiments, the pressing can encourage hydrogen bond formation between the cellulose-based fibers of the cell walls of the bamboo, thereby improving mechanical properties of the densified bamboo structure. Moreover, any particles or materials formed on surfaces of the bamboo or within the bamboo (e.g., via the internal modification of process block 214) can be retained after the pressing, with the particles/materials on internal surfaces being embedded within the collapsed lumina and intertwined cell walls.

The pressure and timing of the pressing can be a factor of the size of the chemically-treated bamboo prior to pressing, the desired size of the bamboo after pressing, the water or fluid content within the bamboo (if any), the temperature at which the pressing is performed, relative humidity, the characteristics of material (e.g., infiltrated polymer) from the internal modification (if any), and/or other factors. For example, the chemically treated bamboo can be held under pressure for a time period of at least 1 minute to up to several hours (e.g., 1-180 minutes, inclusive). In some embodiments, the chemically treated bamboo can be held under pressure for 4-72 hours, inclusive. In some embodiments, the pressing can be performed at a pressure between 0.5 MPa and 10 MPa, inclusive, for example, 5 MPa. In some embodiments the pressing may be performed without heating (e.g., cold pressing), while in other embodiments the pressing may be performed with heating (e.g., hot pressing). For example, the pressing may be performed at a temperature between 20° C. and 140° C., e.g., greater than or equal to 100° C.

The method 200 can proceed from decision block 218 or either of process blocks 220, 222 to decision block 224, where it is determined if an optional external modification should be performed. If an external modification is desired, the method 200 can proceed to process block 226, where the bamboo is subjected to the external modification. Although the term "external" is used to refer to the modification of process block 226, it is contemplated that, in some embodiments, the modification may be applied to internal features as well as external features of the bamboo segment, while in other embodiments the modification may be applied to either internal features or external features of the bamboo segment without otherwise affecting the other feature.

In some embodiments, the external modification can include forming, depositing, or otherwise providing a coating on one or more external surfaces of the bamboo. The coating may imbue the bamboo with certain advantageous properties, such as but not limited to hydrophobicity, weatherability, corrosion resistance (e.g., salt water resistant), and/or flame resistance. For example, the coating can comprise an oil-based paint, a hydrophobic paint, a polymer coating, or a fire-resistant coating. In some embodiments, the fire-resistant coating can include nanoparticles (e.g., boron nitride nanoparticles). Alternatively or additionally, in some embodiments, a coating for the bamboo can include boron nitride (BN), montmorillonite clay, hydrotalcite, silicon dioxide ($SiO_2$), sodium silicate, calcium carbonate ($CaCO_3$), aluminum hydroxide ($Al(OH)_3$), magnesium hydroxide ($Mg(OH)_2$), magnesium carbonate ($MgCO_3$), aluminum sulfate, iron sulfate, zinc borate, boric acid, borax, triphenyl phosphate (TPP), melamine, polyurethane, ammonium polyphosphate, phosphate, phosphite ester, ammonium phosphate, ammonium sulfate, phosphonate, diammonium phosphate (DAP), ammonium dihydrogen phosphate, monoammonium phosphate (MAP), guanylurea phosphate (GUP), guanidine dihydrogen phosphate, antimony pentoxide, or any combination of the above.

The method 200 can proceed from decision block 224 or process block 226 to decision block 228, where it is determined if an optional shaping of the bamboo segment should be performed. If shaping is desired, the method 200 can proceed to process block 230, where the bamboo segment can be machined, cut, and/or otherwise physically altered (e.g., bending) in preparation for eventual use.

The method 200 can proceed from decision block 228 or process block 230 to process block 232, where the fabricated bamboo can be used in a particular application. Depending on the fabrication, the resulting bamboo may have improved mechanical properties, different porosity, transparency, and/or other properties that can be used to advantage in a number of different applications. For example, the bamboo can be adapted for use as structural material (e.g., a load bearing component or a non-load bearing component) and/or a structure with unique functionality (e.g., a filtration membrane, deflective membrane, and/or transparent medium). Other applications beyond those specifically listed are also possible for the bamboo structures fabricated according to the disclosed technology. Indeed, one of ordinary skill in the art will readily appreciate that the bamboo structures disclosed herein can be adapted to other applications based on the teachings of the present disclosure.

Although blocks 202-232 of method 200 have been described as being performed once, in some embodiments, multiple repetitions of a particular process block may be employed before proceeding to the next decision block or process block. For example, the solvent exchange of process block 212 may be repeated multiple times to ensure sufficient removal of water from the bamboo. In another example, the rinsing of process block 208 may be repeated multiple times (or comprise a continuous washing with rinsing solution) to ensure sufficient removal of the chemical treatment solution. In addition, although blocks 202-232 of method 200 have been separately illustrated and described, in some embodiments, process blocks may be combined and performed together (simultaneously or sequentially). For example, the solvent exchange of process block 212 may be combined with the rinsing of process block 208. In another example, the drying of process block 212 may be combined with the drying of process block 220 or the pressing of process block 222. Moreover, although FIG. 2 illustrates a particular order for blocks 202-232, embodiments of the disclosed subject matter are not limited thereto. Indeed, in certain embodiments, the blocks may occur in a different order than illustrated or simultaneously with other blocks. For example, the shaping of process block 230 can occur before the external modification of process block 226.

As noted above, in some embodiments, the chemically-treated bamboo can be subjected to densification. In conventional densification processes, natural bamboo is pressed without otherwise removing lignin therefrom. In such conventional processes, a pre-treatment (e.g., exposure to steam, heat, or ammonia, or cold rolling) of the bamboo may be required. While such pre-treatments may soften the bamboo structure to allow densification via pressing, they do not change the underlying composition of the natural bamboo. As a result, the amount of densification is limited, in general, to about a 50% reduction in thickness as compared to the original natural bamboo. Without first removing at least some lignin, it can be difficult to press the bamboo to collapse lumina and any other voids in its cross-section. Moreover, in conventional processes, partial recovery of thickness of the bamboo can occur after pressing.

In contrast, in some embodiments, bamboo that has at least some lignin removed can be pressed to form a unique laminated structure, with cell walls tightly intertwined together to thereby yield superior mechanical properties. For example, by pressing bamboo that has been chemically treated to remove at least some lignin therefrom, the bamboo lumina and the porous cell walls can collapse entirely and any open spaces between cells walls can be eliminated. Due to the lignin removal, the pressing can achieve an increased reduction in dimension, for example, at least a 5:2 reduction (e.g., between 70% and 80% reduction) in thickness, as well as an increased density (e.g., about 3 times increase).

Figure 4A:
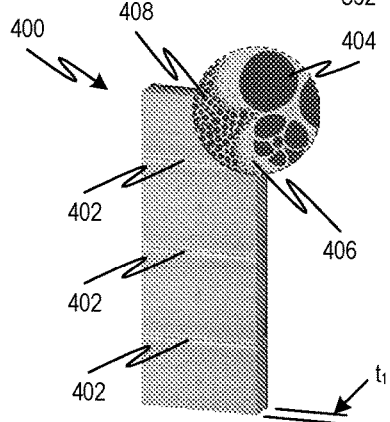
FIG. 4A is a simplified illustration of a flattened piece of natural bamboo prior to chemical treatment to remove lignin, with the inset showing a magnified view of the microstructure of the culm wall.
Figure 4B:
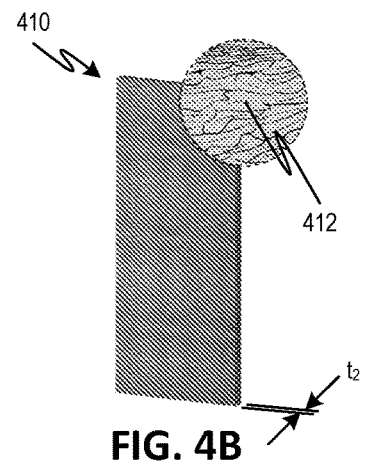
FIG. 4B is a simplified illustration of the flattened piece of bamboo after chemical treatment and pressing, with the inset showing a magnified view of the collapsed microstructure of the culm wall.

FIG. 4A illustrates a bamboo segment 400 with lumina prior to chemical treatment and pressing. The bamboo segment 400 can be a flattened piece of a culm wall of natural bamboo including one or more nodes 402 (or alternatively, the internodal region only without nodes 402). Prior to pressing, the bamboo segment 400 can retain is native microstructure, including parenchyma cells 408, vessels 404, and fibers bundles 406 (as shown in the magnified inset of FIG. 4A). Subjecting the bamboo segment 400 to chemical treatment to remove at least some lignin and then pressing along the radial direction (e.g., in a direction crossing the longitudinal direction, or the direction of extension of lumina in the culm wall) can result in the densified bamboo segment 410 of FIG. 4B. As a result of the pressing, the lumina within the culm wall can fully collapse, and the cell walls 412 can become intertwined (as shown in the magnified inset of FIG. 4B). The pressing can be such that a thickness $t_2$ of the bamboo segment 410 after pressing is reduced by at least 10% as compared to $t_1$ of the bamboo segment 400 before pressing. For example, the thickness $t_2$ may be reduced by greater than 60%, 70%, or 80%, as compared to $t_1$ of the segment 400. For example, the pressing can result in a compression ratio ($W_1:W_2$) of from 1.1:1 to 10:1, inclusive.

As a result of this compressed structure, hydrogen bonding can be enhanced among the aligned fibers of the culm wall. In particular, due to the rich hydroxyl groups in cellulose molecular chains, relative sliding among the densely packed cell walls in the densified bamboo when subjected to a stress involves a large number of repeating events of hydrogen bond formation-breaking-reformation at the molecular scale. Consequently, the total energy needed to fracture the densified bamboo is significantly higher than that needed to fracture natural bamboo. In other words, the densified bamboo is much tougher than natural bamboo. The densely packed microstructure also drastically reduces both the quantity and size of defects in the densified bamboo, thus leading to a much higher strength than natural bamboo. The mechanical properties of the densified bamboo are not only superior to those of natural bamboo, but also exceed those of many widely used structural materials (e.g., plastics, steel and alloys). Indeed, the demonstrated tensile strength for the densified bamboo is much higher than that of typical plastics (e.g., nylon 6, polycarbonate, polystyrene, and epoxy) as well as conventional densified bamboo that does not remove lignin therefrom. The significant increase in tensile strength of the densified bamboo also does not suffer from a decrease in toughness. The intrinsic lightweight nature of cellulose also results in a specific strength for the densified bamboo of at least 300 MPa/($cm^3$/g), for example, about 450 MPa/

(cm³/g), which specific strength exceeds that for titanium alloy (e.g., about 244 MPa/(cm³/g)).

Figure 3A:
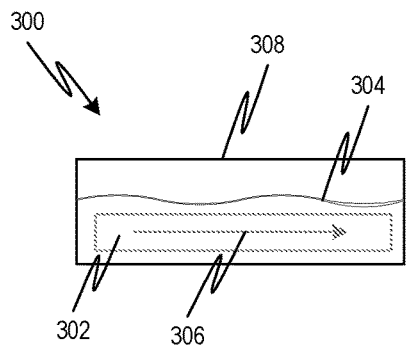
FIG. 3A is a simplified schematic illustration of an exemplary pressing process for bamboo, according to one or more embodiments of the disclosed technology.
Figure 3A:
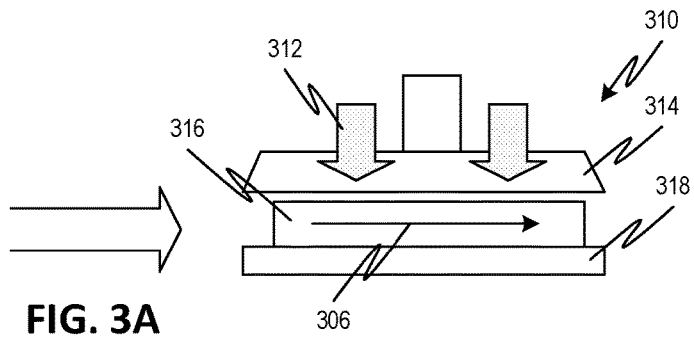

Referring now to FIG. 3A, an exemplary fabrication process for forming a densified bamboo structure from natural bamboo 302 is shown. The natural bamboo 302 may be in the form of a sheet, stick, strip, bar, tube, block, membrane, film, or any other shape. Lumina within the natural bamboo 302 can extend along the longitudinal direction 306. The treatment 300 in the fabrication process can be immersing the natural bamboo 302 within a chemical solution 304, for example, as described above with respect to process block 204 of method 200, to remove at least some lignin from the bamboo 302. The chemical solution 304, and the bamboo 302 immersed therein, may be contained within a housing 308. In some embodiments, the housing 308 may be a vacuum housing and may maintain the solution 304 and bamboo 302 under vacuum during the immersion. Alternatively or additionally, the housing 308 or another component therein can heat the solution 304 to an elevated temperature. For example, the solution 304 may be heated to boiling during the chemical treatment 300.

After the treatment 300, the chemically treated bamboo 316 may be conveyed from housing 308 to a compression station 310 for pressing in a direction substantially perpendicular to, or at least crossing, the longitudinal direction 306, for example, as described above with respect to process block 222 of method 200. For example, the compression station 310 can include an upper platen 314 and a lower platen 318. Relative motion between the platens 314, 318 results in the desired compression of chemically treated bamboo 316 to produce the densified bamboo. For example, upper platen 314 may move toward lower platen 318, which remains stationary and supports the bamboo 316 thereon, in order to impart a compression force 312 to the bamboo 316. Alternatively, both platens 314 and 318 may move toward each other to impart the compression force 312. In some embodiments, during the compression, one or both platens 314, 318 can be heated so as to raise a temperature of the bamboo 316 above ambient. Alternatively or additionally, the platens 314, 318 may be unheated but a separate heating mechanism may be provided or an environment containing the compression station may be heated in order to raise a temperature of the bamboo 316.

Figure 3B:
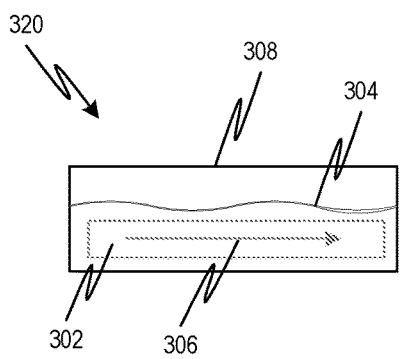
FIG. 3B is a simplified schematic illustration of another exemplary pressing process for bamboo, according to one or more embodiments of the disclosed technology.
Figure 3B:
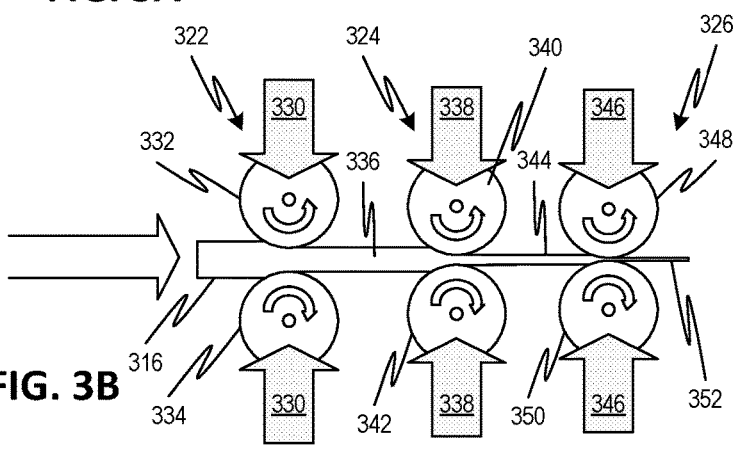

Referring to FIG. 3B, another exemplary fabrication process for forming a densified bamboo structure from natural bamboo 302 is shown. The natural bamboo 302 may be in the form of a sheet, stick, strip, bar, tube, block, membrane, film, or any other shape. Lumina within the natural bamboo 302 can extend along the longitudinal direction 306. The treatment 320 in the fabrication process can be immersing the natural bamboo 302 within a chemical solution 304, for example, as described above with respect to process block 204 of method 200, to remove at least some lignin from the bamboo 302. The chemical solution 304, and the bamboo 302 immersed therein, may be contained within a housing 308. In some embodiments, the housing 308 may be a vacuum housing and may maintain the solution 304 and bamboo 302 under vacuum during the immersion. Alternatively or additionally, the housing 308 or another component therein can heat the solution 304 to an elevated temperature. For example, the solution 304 may be heated to boiling during the chemical treatment 300.

After the treatment 320, the chemically treated bamboo 316 may be conveyed from housing 308 to one or more compression stations. In the illustrated example of FIG. 3B, multiple compression stations 322, 324, and 326 can be provided in series. Each subsequent compression station in the series may define a narrower thickness for the bamboo 316, thereby incrementally compressing the bamboo 316 in stages. For example, first compression station 322 can include an upper roller 332 and a lower roller 334, which rollers may remain at a fixed first distance from each other. The fixed first distance may be less than a thickness of the chemically treated bamboo 316, thereby apply a pressing force 330 to the bamboo 316 and defining a first reduction in thickness for the bamboo. The second compression station 324 can also include an upper roller 340 and a lower roller 342, which rollers may remain at a fixed second distance from each other and which second distance is less than the first distance of the first compression station 322. The fixed second distance may be less than a thickness of the pressed bamboo 336 fed from the first compression station 322, thereby applying a further pressing force 338 to the bamboo 336 and defining a second reduction in thickness for the bamboo. The third compression station 326 can also include an upper roller 348 and a lower roller 350, which rollers may remain at a fixed third distance from each other and which third distance is less than the second distance of the second compression station 324. The fixed third distance may be less than a thickness of the pressed bamboo 344 fed from the second compression station 324, thereby applying a further pressing force 346 to the bamboo 344 and defining a third reduction in thickness for the bamboo, thereby resulting in the final densified bamboo 352. In some embodiments, during the compression, one, some, or all of the rollers 332, 334, 340, 342, 348, 350 can be heated so as to raise a temperature of the bamboo above ambient. Alternatively or additionally, one, some, or all of the rollers 844, 846 may be unheated but a separate heating mechanism may be provided or an environment containing one or more of the compression stations 322-326 may be heated in order to raise a temperature of the bamboo during pressing.

As compared to a single compression station, the arrangement of FIG. 3B may allow for larger reductions in thickness (e.g., greater densification) to be achieved without fracturing or otherwise damaging the densified bamboo during processing. In some embodiments, each compression station 322-326 can yield the same reduction in thickness to the bamboo segment fed therein, such that the final reduction in thickness is simply three times the incremental reduction of each compression station. In other embodiments, the reduction in thickness offered by each station 322-326 may be different, for example, with the first compression station 322 resulting in the largest thickness reduction, and each subsequent compression station resulting in a smaller magnitude thickness reduction.

Although a particular number of rollers and compression stations are shown in FIG. 3A, additional or fewer rollers for each compression station and/or additional or fewer compression stations are also possible according to one or more contemplated embodiments. In some embodiments, the bamboo can be maintained under pressure as it is conveyed between adjacent rollers, in order to provide a desired cumulative time of compression (e.g., on the order of minutes or hours). Alternatively or additionally, the size of each roller and the speed of conveyance of the bamboo may correspond to a desired compression time for each stage (e.g., compression station or series of rollers corresponding to a desired thickness reduction). For example, a time from when the bamboo 316 enters the first compression station 322 to when it exits the compression station 322 can correspond to a desired pressing time. Of course, it also possible to couple the compression stations 322-326 to the chemical treatment 320, for example, via a continuous bamboo sheet for processing extending between an output of chemical treatment station 320 and an input to first compression station 322.

Figure 3C:
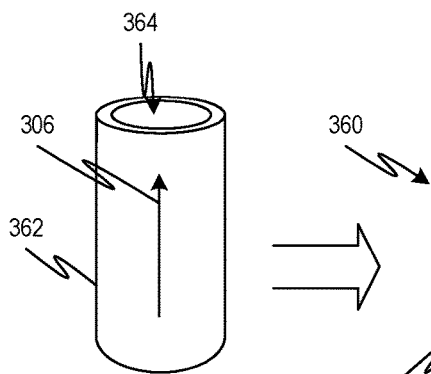
FIG. 3C is a simplified schematic illustration of yet another exemplary pressing process for bamboo, according to one or more embodiments of the disclosed technology.
Figure 3C:
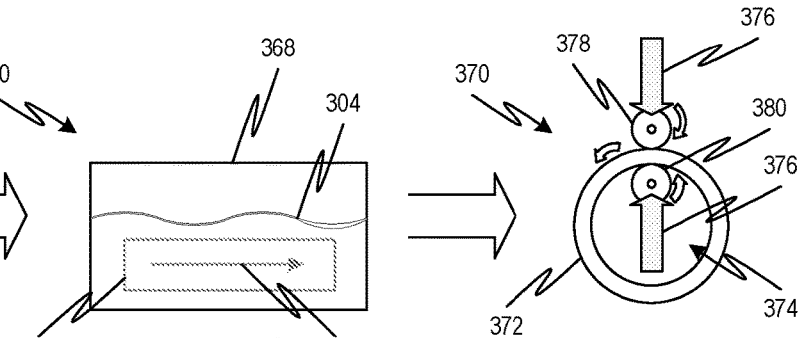

Referring to FIG. 3C, an exemplary fabrication process for forming a densified bamboo structure from natural bamboo 362 is shown. The natural bamboo 362 may retain its natural shape (e.g., a cylinder with a hollow interior 364 defined by the native culm wall, with or without removal of the nodal diaphragm) with lumina extending along longitudinal direction 306. The treatment 360 in the fabrication process can be immersing the natural bamboo 362 within a chemical solution 304, for example, as described above with respect to process block 204 of method 200, to remove at least some lignin from the bamboo 362. The chemical solution 304, and the bamboo 362 immersed therein, may be contained within a housing 366, which may be configured to apply a vacuum and/or heat during the immersion similar to housing 308 of FIG. 3A.

After the treatment 360, the chemically treated bamboo cylinder 372 may be conveyed from housing 368 to a compression station 370 for pressing in a direction substantially perpendicular to, or at least crossing, the longitudinal direction 306 (which is perpendicular to the plane of the page at station 370 of FIG. 3C), for example, as described above with respect to process block 222 of method 200. For example, the compression station 370 can include an upper roller 378 disposed on an exterior of the cylinder 372 and a lower roller 380 disposed within an interior 374 of the cylinder 372. The rollers 378, 380 may remain at a fixed distance from each other as the culm wall of the chemically treated bamboo cylinder 372 passes therethrough. The fixed distance may be less than a wall thickness of the bamboo 372, thereby applying a pressing force 376 that results in a hollow cylinder of densified bamboo.

In some embodiments, during the compression, one or both rollers 378, 380 can be heated so as to raise a temperature of the bamboo 372 above ambient. Alternatively or additionally, the rollers 378, 380 may be unheated but a separate heating mechanism may be provided or an environment containing the compression station 370 may be heated in order to raise a temperature of the bamboo. Although only two rollers 378, 380 are shown in FIG. 3C, multiple rollers may be disposed in series around the circumference of the cylinder 372. The wall of the cylinder 372 can be maintained under pressure as it is conveyed between adjacent rollers, in order to provide a desired cumulative time of compression (e.g., on the order of minutes or hours). Alternatively or additionally, the size of the rollers 378, 380 and the speed of rotation of the cylinder 372 may correspond to the desired compression time.

Although particular bamboo shapes and fabrication techniques have been illustrated in FIGS. 3A-3C, other shapes (whether solid or hollow) and fabrication techniques are also possible according to one or more contemplated embodiments. Accordingly, the bamboo shapes and fabrication techniques are not limited to those specifically illustrated. Moreover, although rinsing stations and pre-pressing and post-pressing modifications have not been illustrated in FIGS. 3A-3C, these techniques can be readily modified to include rinsing, pre-pressing modification and/or post-pressing modification, for example, as described above with respect to the method 200 of FIG. 2.

Figure 5A:
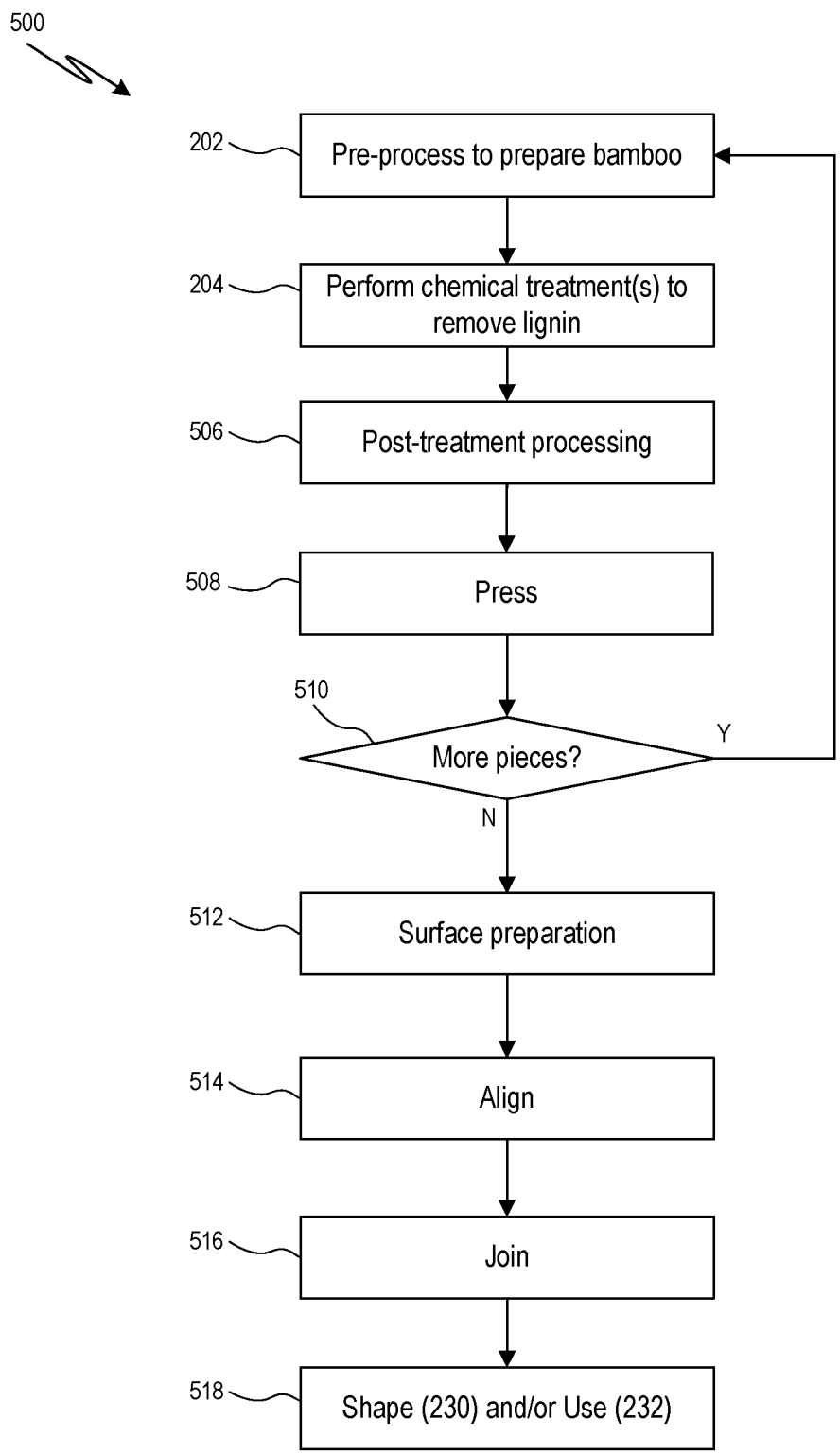
FIG. 5A is an exemplary process flow diagram for fabricating laminate bamboo structures, according to one or more embodiments of the disclosed technology.

In some embodiments, it may be preferable to combine bamboo segments together, for example, to reduce anisotropy or to otherwise improve mechanical properties. For example, FIG. 5A shows a generalized method 500 for forming a laminate structure from multiple densified bamboo segments. Similar to method 200 of FIG. 2, method 500 can include process block 202 (pre-processing) followed by process block 204 (one or more chemical treatments to remove at least some lignin). After process block 204, the method 500 can proceed to process block 506, where optional post-treatment processing is performed. For example, post-treatment processing can include internal modification similar to that described above for process block 216 in method 200 of FIG. 2. After any post-treatment processing, the method 500 can proceed to process block 508, where densification of the bamboo segment is performed by pressing. For example, the pressing can be similar to the pressing described above for process block 222 of method 200 in FIG. 2 or to the pressing described above for any of FIGS. 3A-3C. These initial process blocks are then repeated at 510 to produce multiple separate pieces of densified bamboo.

Once a sufficient number of densified bamboo pieces have been prepared, the method 500 can proceed to process block 512, where the densified bamboo pieces are optionally subjected to a surface preparation. In some embodiments, pieces of densified bamboo can be coupled together using a glue or epoxy. In such embodiments, the preparation of process block 512 may include applying the glue or epoxy to one or more facing surfaces of the densified bamboo. In other embodiments, eventual hydrogen bonding between facing surfaces of the densified bamboo pieces may be sufficient to hold them together, in which case process block 512 may be omitted.

Figures 6A, 6B, 6C:
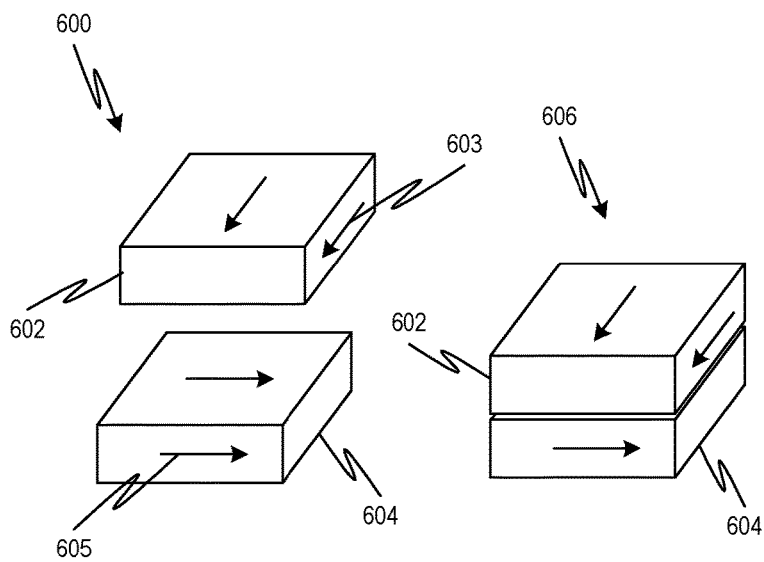
FIG. 6A is a simplified schematic of an arrangement of pieces of chemically treated bamboo for forming a laminate structure, according to one or more embodiments of the disclosed technology.
FIG. 6B is a simplified schematic of a laminate structure formed by the chemically treated bamboo pieces of FIG. 6A, according to one or more embodiments of the disclosed technology.
FIG. 6C is a simplified schematic of a multi-layer laminate structure formed of the chemically treated bamboo pieces of FIG. 6B, according to one or more embodiments of the disclosed technology.
Figures 6D, 6E, 6F:
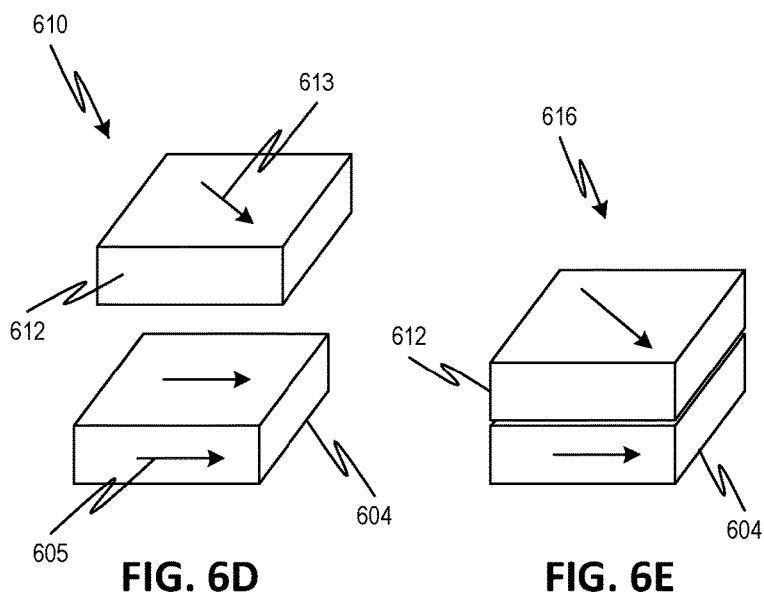
FIG. 6D is a simplified schematic of another arrangement of pieces of chemically treated bamboo for forming a laminate structure, according to one or more embodiments of the disclosed technology.
FIG. 6E is a simplified schematic of a laminate structure formed by the chemically treated bamboo pieces of FIG. 6D, according to one or more embodiments of the disclosed technology.
FIG. 6F is a simplified schematic of a multi-layer laminate structure formed of the chemically treated bamboo pieces of FIG. 6E, according to one or more embodiments of the disclosed technology.

The method 500 can proceed to process block 514, where the densified bamboo pieces can be arranged in preparation for joining. Each of the densified bamboo pieces can have a respective orientation, which corresponds to its longitudinal direction (e.g., in which the lumina of the bamboo extended prior to the pressing). In some embodiments, the aligning of process block 514 can thus include arranging the densified bamboo pieces such that at least some of the bamboo pieces have different orientations with respect to each other (e.g., not aligned or parallel to each other in a plan view). For example, FIG. 6A shows a set 600 for a laminate, having a first piece 602 of densified bamboo with a first orientation 603 and a second piece 604 of densified bamboo with a second orientation 605. The first piece 602 and the second piece 604 can be arranged such that the first orientation 603 is orthogonal to the second orientation 605 (e.g., when viewed in a plan view, for example, along a direction perpendicular to a top or bottom plane of the laminate) once the pieces are joined as a laminate structure 606, as shown in FIG. 6B. Alternatively or additionally, in some embodiments, the orientations of coupled pieces of densified bamboo are at a non-orthogonal angle with respect to each other (e.g., at least crossing when viewed in the plan view). For example, FIG. 6D shows another set 610 for a laminate, where third piece 612 of densified bamboo has a third orientation 613 different from that of the first piece 602 in FIG. 6A. When the third piece 612 is coupled to the second piece 604, as illustrated in FIG. 6E, a direction of the orientation 613 of the third piece crosses a direction of the orientation 605 of the second piece 604 in a plan view.

Multiple sets 606 can be joined together to form a multi-layer laminate structure, as shown in FIG. 6C, with each piece of densified bamboo having an orientation rotated 90° with respect to an adjacent piece. Similarly, multiple sets can be joined together to form a multi-layer 616, 618 laminate structure, as shown in FIG. 6F, with each piece of densified bamboo having an orientation different than that of adjacent piece, and/or each layer having a different composite orientation than that of adjacent layers. Although a particular number of densified bamboo pieces for a laminated structure is illustrated in FIGS. 6A-6F, other numbers of densified bamboo pieces are also possible according to one or more contemplated embodiments. Moreover, although rectangular shapes are illustrated in FIGS. 6A-6F, other shapes are also possible according to one or more contemplated embodiments. Moreover, other orientations and alignments beyond those illustrated in FIGS. 6A-6F are also possible according to one or more contemplated embodiments. In some embodiments, the orientations of adjacent bamboo pieces may be aligned, for example, to enhance anisotropy.

Returning to FIG. 5A, after process block 514, the method 500 can proceed to process block 516, where the aligned densified bamboo pieces are joined together, for example, by glue/epoxy or by hydrogen bonding. In those embodiments where hydrogen bonding is used, the joining of process block 516 can include pressing the aligned pieces together under high pressure, similar to the pressing used to form the densified bamboo pieces in process block 508. Once joined to form a laminate structure, the method 500 can proceed to process block 518, where the laminate can be adapted for use (for example, as described above with respect to process block 230 of method 200) and/or used (for example, as described above with respect to process block 232 of method 200).

Although FIG. 5A forms the pieces of densified bamboo prior to joining, embodiments of the disclosed subject matter are not limited thereto. Rather, in some embodiments, the joining of bamboo pieces may be combined with the pressing to densify the bamboo pieces, for example, as in the generalized method 550 of FIG. 5B. Similar to method 200 of FIG. 2, method 550 can include process block 202 (pre-processing) followed by process block 204 (one or more chemical treatments to remove at least some lignin). After process block 204, the method 550 can proceed to process block 556, where optional post-treatment processing is performed. For example, post-treatment processing can include internal modification similar to that described above for process block 216 in method 200 of FIG. 2. These initial process blocks are then repeated at 558 to produce multiple separate pieces of chemically treated bamboo. Once a sufficient number of chemically treated bamboo pieces have been prepared, the method 550 can proceed to process block 560, where the chemically treated bamboo pieces are arranged in preparation for joining. Each of the chemically treated bamboo pieces can have a respective orientation, which corresponds to its longitudinal direction. The aligning of process block 560 can thus include arranging the chemically treated bamboo pieces with respect to each other, as otherwise described above with respect to FIG. 5A and FIGS. 6A-6F.

After process block 560, the method 550 can proceed to process block 562, where the arranged chemically treated bamboo pieces are pressed together. For example, the pressing can be similar to the pressing described above for process block 222 of method 200 in FIG. 2, to the pressing described above for process block 516 of method 500 in FIG. 5A, and/or to the pressing described above for any of FIGS. 3A-3C. The pressing of process block 562 can be effective to compress each bamboo piece (i.e., to produce densified bamboo pieces) and to cause hydrogen bonding to form between facing surfaces of the bamboo pieces. The pressing of process block 562 thus simultaneously produces the densification and joining of the bamboo pieces to form a laminate structure. Further layers can be added to the laminate by repeating process blocks 202, 204, 556, 560, and 562 via decision block 564. Otherwise, the method 550 can proceed to process block 518, where the laminate can be adapted for use (for example, as described above with respect to process block 230 of method 200) and/or used (for example, as described above with respect to process block 232 of method 200).

Although particular bamboo shapes and fabrication techniques have been illustrated in FIGS. 6A-6F, other shapes (whether solid or hollow) and fabrication techniques are also possible according to one or more contemplated embodiments. Accordingly, the bamboo shapes and fabrication techniques are not limited to those specifically illustrated. Moreover, although rinsing, water removal, drying, and post-pressing external modifications have not been illustrated in FIGS. 5A-5B or explicitly discussed in methods 500, 550, these methods can be readily modified to include rinsing, water removal, drying, and/or post-pressing external modifications, for example, as described above with respect to method 200 of FIG. 2.

Figure 5B:
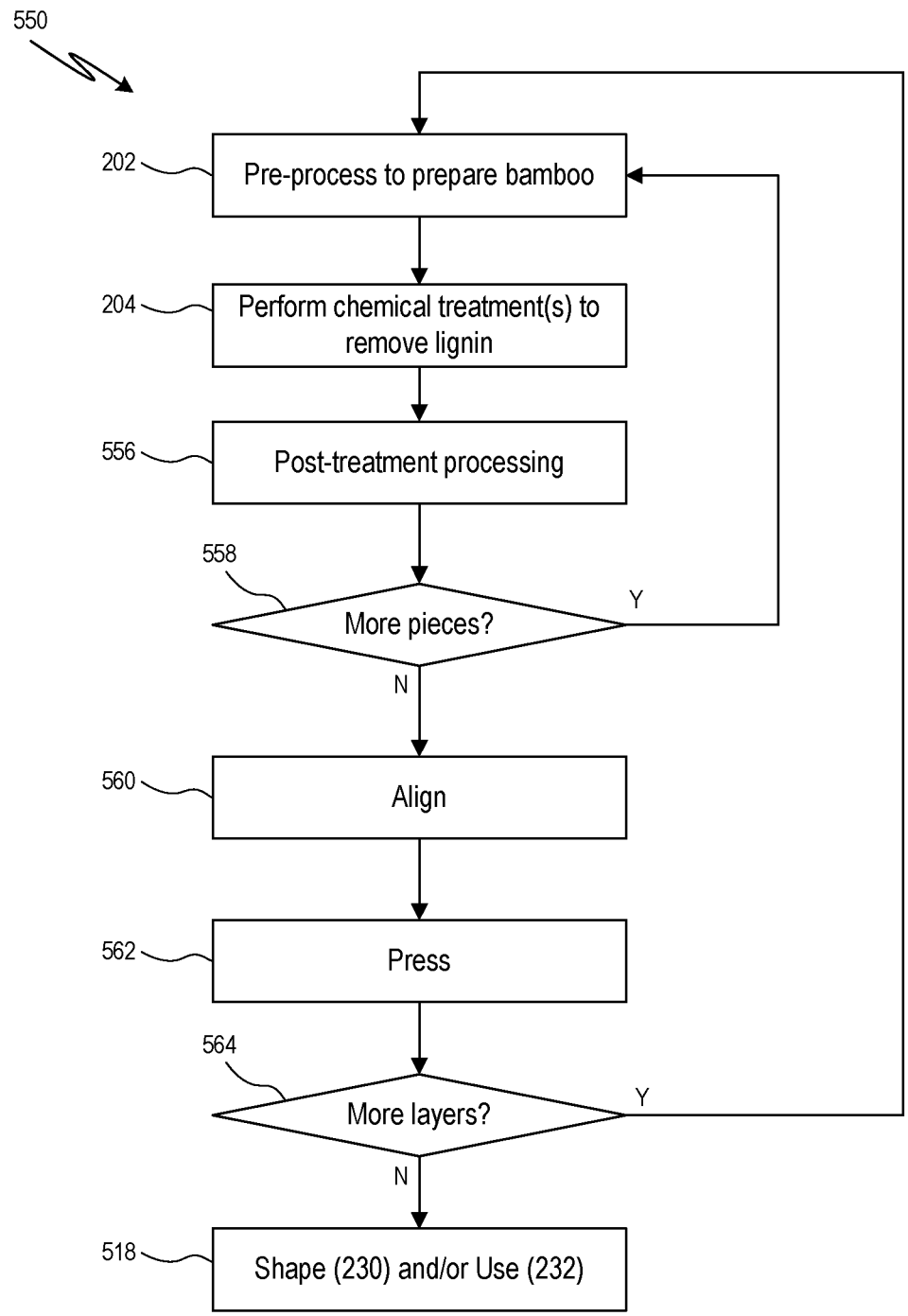
FIG. 5B is another exemplary process flow diagram for fabricating laminate bamboo structures, according to one or more embodiments of the disclosed technology.

Although blocks 202-204, 506-518 of method 500 and blocks 202-204, 556-564, and 518 of method 550 have been described as being performed once, in some embodiments, multiple repetitions of a particular process block may be employed before proceeding to the next decision block or process block. In addition, blocks 202-204, 506-518 of method 500 and blocks 202-204, 556-564, and 518 of method 550 have been separately illustrated in FIGS. 5A-5B, respectively, in some embodiments, process blocks may be combined and performed together (simultaneously or sequentially). Moreover, although FIGS. 5A-5B illustrate a particular order for blocks 202-204, 506-518 of method 500 and blocks 202-204, 556-564, and 518 of method 550, respectively, embodiments of the disclosed subject matter are not limited thereto. Indeed, in certain embodiments, the blocks may occur in a different order than illustrated or simultaneously with other blocks.

Figure 7A:
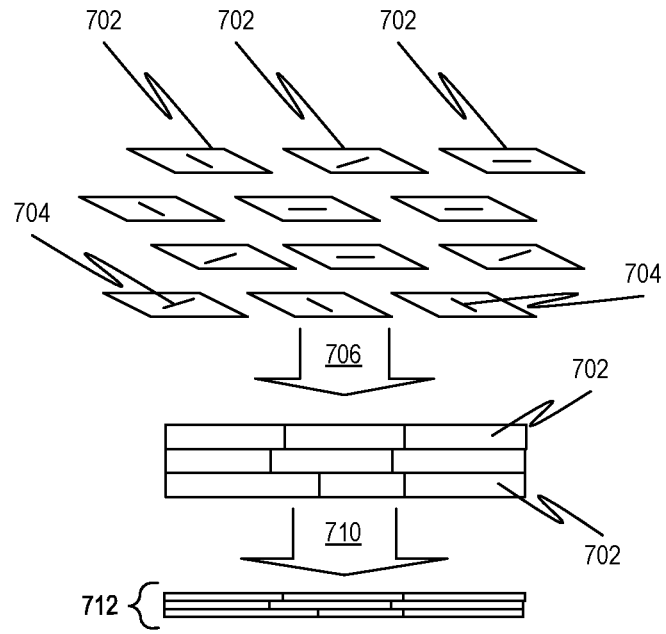
FIG. 7A is a simplified schematic illustration of another exemplary process for fabricating a laminate structure from bamboo, according to one or more embodiments of the disclosed technology.

In some embodiments, a laminate structure can be formed from multiple bamboo chips with different orientations for their longitudinal directions. For example, FIG. 7A illustrates aspects of an exemplary fabrication process for forming a laminate of densified bamboo from individual bamboo segments 702. The individual bamboo segments 702 may have respective orientations 704, which correspond to their longitudinal directions (e.g., a direction in which the natural lumina extended and/or along which cellulose fibers therein are aligned). Similar to the method 200 described above, the bamboo segments 702 can be subject to chemical treatment(s) to remove at least some lignin therefrom and then assembled at 706 into a multilayer structure. In some embodiments, the assembly of the chemically modified bamboo segments can take into account the orientations 704 of the segments 706, for example, such that orientations are orthogonal as in FIGS. 6A-6B, crossing as in FIGS. 6D-6E, or otherwise aligned. Alternatively, in some embodiments, the orientations 704 can be random within the multilayer structure. The multilayer structure can then be pressed at 710 to form a multilayer laminate 712 of densified bamboo segments. Adjacent densified segments can be held together by hydrogen bonds formed during the pressing 710.

Figure 7B:
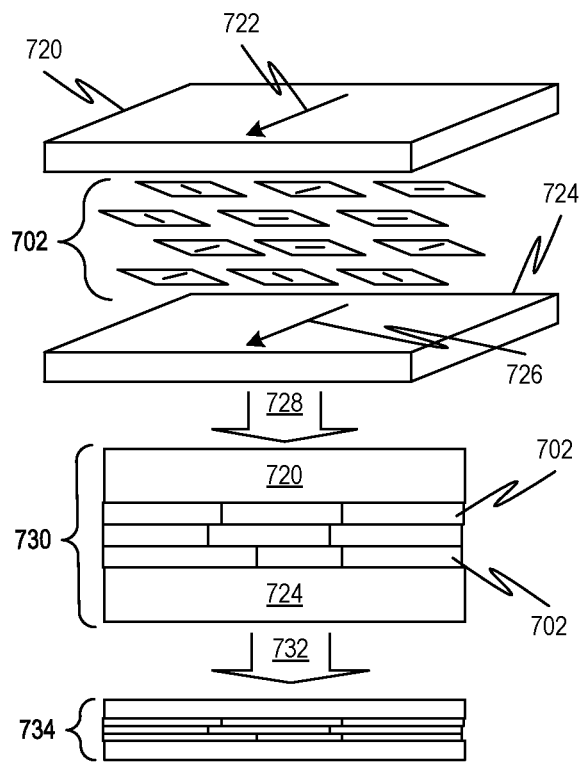
FIG. 7B is a simplified schematic illustration of another exemplary process for fabricating a laminate structure from bamboo, according to one or more embodiments of the disclosed technology.

In some embodiments, a laminate structure can be formed from bamboo sheets and multiple bamboo segments with different fiber orientations. For example, FIG. 7B illustrates aspects of an exemplary fabrication process for forming a laminate of densified bamboo from individual bamboo segments 702 (e.g., chips) and at a pair of bamboo sheets 720, 724. The individual bamboo segments 702 may have respective orientations 704 corresponding to their longitudinal directions. Similarly, bamboo sheets 720, 724 can have respective orientations 722, 726 that correspond to their longitudinal directions. Similar to the method 200 described above, the bamboo sheets 720, 724 and the bamboo segments 702 can be subject to chemical treatment to remove at least some lignin therefrom and then assembled at 728 into a multilayer structure, with the bamboo segments 702 arranged between the sheets 720, 724.

The assembly may take into account the orientations of the sheets 720, 724 and the segments 702. For example, in some embodiments, the arrangement at 728 can be such that orientations 704 of at least the segments 702 are orthogonal as in FIGS. 6A-6B, crossing as in FIGS. 6D-6E, or otherwise aligned. Alternatively, in some embodiments, the orientations 704 of at least the segments 702 can be random within the multilayer structure. In some embodiments, the arrangement at 728 can be such that orientations 722, 726 of at least the sheets 720, 724 are orthogonal as in FIGS. 6A-6B, crossing as in FIGS. 6D-6E, or otherwise aligned. In some embodiments, the orientations 704 of the segments 702 may be aligned dependent on the orientations of at least one of the sheets 720, 724, or independent of the sheet orientation. For example, in some embodiments, the orientations 722, 726 may be orthogonal to each other, whereas the orientations 704 of the segments 702 may be substantially random.

The multilayer structure 730 can then be pressed at 732 to form a multilayer laminate 734 of densified bamboo. Adjacent pieces of the densified bamboo can be held together by hydrogen bonds formed during the pressing. Although three layers of segments 702 are shown between sheets 720, 724 in FIG. 7B, fewer or additional layers are also possible in some embodiments, for example, a single layer of bamboo segments 702 or more than three layers of bamboo segments 702. Moreover, embodiments of the disclosed subject matter are not limited to the specific number and arrangement of sheets and segments illustrated in FIGS. 7A-7B. For example, in some embodiments, laminate 734 may form a layer unit in a multilayer structure, where densified sheet 724 of one unit 734 is atop and coupled to densified sheet 720 of an adjacent unit 734. In some embodiments, a multilayered laminate structure may include repeating layers of sheet 720 (or sheet 724) with intervening layers of bamboo segments 702.

Although rinsing, pre-pressing modification, and post-pressing modification have not been separately illustrated in FIGS. 7A-7B or explicitly discussed, FIGS. 7A-7B can be readily modified to include rinsing, pre-pressing modification, and/or post-pressing modification, for example, as described above with respect to method 200 of FIG. 2. Although a particular number of bamboo segments or sheets for a laminated structure is illustrated in FIGS. 7A-7B, in some embodiments, other numbers of densified bamboo segments or sheets are used. Moreover, although rectangular shapes are illustrated in FIGS. 7A-7B, in some embodiments, other shapes (whether regular or irregular) may be employed. In addition, in some embodiments, other orientations and alignments beyond those illustrated in FIGS. 7A-7B are employed.

Figure 8:
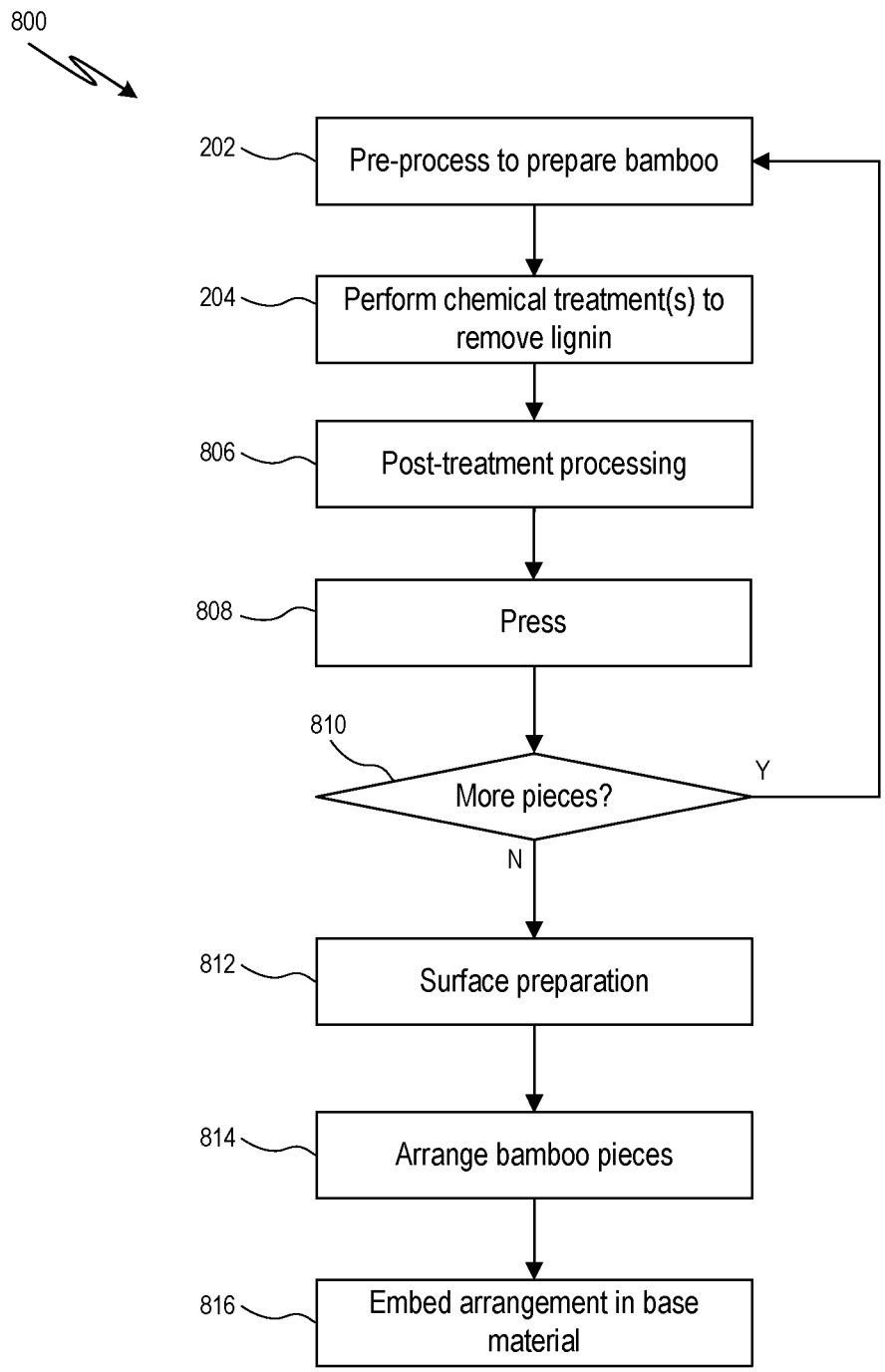
FIG. 8 is an exemplary process flow diagram for fabricating a bamboo-reinforced composite, according to one or more embodiments of the disclosed technology.

In some embodiments, densified bamboo segments can be combined with a base material, for example, to form a bamboo-reinforced composite structure. For example, FIG. 8 shows a generalized method 800 for forming a composite structure using multiple densified bamboo segments. Similar to method 200 of FIG. 2, method 800 can include process block 202 (pre-processing) followed by process block 204 (one or more chemical treatments to remove at least some lignin). After process block 204, the method 800 can proceed to process block 806, where optional post-treatment processing is performed. For example, post-treatment processing can include internal modification similar to that described above for process block 216 in method 200 of FIG. 2. After any post-treatment processing, the method 800 can proceed to process block 808, where densification of the bamboo segment is performed by pressing. For example, the pressing can be similar to the pressing described above for process block 222 of method 200 in FIG. 2 or to the pressing described above for any of FIGS. 3A-3C. These initial process blocks are then repeated at 810 to produce multiple separate pieces of densified bamboo. Once a sufficient number of densified bamboo pieces have been prepared, the method 800 can proceed to process block 812, where the densified bamboo pieces are optionally subjected to a surface preparation. In some embodiments, the surface preparation can include external modification similar to that described above for process block 226 in method 200 of FIG. 2. For example, the surface preparation can include applying a hydrophobic polymer coating to each densified bamboo piece.

After the surface preparation, the method 800 can proceed to process block 814, where the densified bamboo pieces can be arranged. In some embodiments, the densified bamboo pieces can be arranged in an array (e.g., 1-D, 2-D, or 3-D array), for example, with equal or unequal spacings between adjacent pieces in the array. In some embodiments, the densified bamboo pieces can be arranged in contact with each other, for example, as a checkered or interweaving pattern. In some embodiments, the densified bamboo pieces can have a random arrangement, for example, with respective longitudinal directions at random orientations.

The method 800 can proceed to process block 816, where the densified bamboo pieces are embedded within a base material. In some embodiments, the base material is a concrete. The concrete can be poured over the arrangement of bamboo pieces and allowed to harden to form the composite structure with bamboo embedded therein. The concrete can be any type of conventional concrete. In some embodiments, the concrete may comprise green construction materials, such as fly ash, blast furnace slag, waste paper, glass, plastic waste, rice husk ash, corn cob ash, sawdust ash, fly ash, palm oil fuel ash, silica fume (or microsilica), or any combination of the above. Alternatively or additionally, in some embodiments, the base material is a polymer. The polymer can be poured over the arrangement of bamboo pieces and cured or hardened to form the composite structure with bamboo embedded therein. The polymer for the base material can be any type of thermosetting or thermoplastic polymer. For example, the polymer can be an epoxy resin, PVA, PEO, PA, PET, PBT, PTT, PAN, PA6, PMIA, PPTA, PU, PC, PP, HDPE, PS, PCL, PBS, PBAT, PBSA, PHB, PHBV, PGA, PPy, PTh, PVDF, PVF, EVOH, PVDC, MXD6, PE, PVC, PMMA, ABS, PI, PEI, PLA, OTS, POSS, PMS, PDMS, PEN, ABSM, DTMS, rosin, chitin, chitosan, protain, plant oil, lignin, hemicellulose, carboxymethyle cellulose, cellulose acetate, starch, agar, or any combination of the above.

Although blocks 202-204, 806-816 of method 800 have been described as being performed once, in some embodiments, multiple repetitions of a particular process block may be employed before proceeding to the next decision block or process block. In addition, blocks 202-204, 806-816 of method 800 have been separately described and illustrated in FIG. 8, in some embodiments, process blocks may be combined and performed together (simultaneously or sequentially). For example, in some embodiments, the arrangement of process block 814 may occur simultaneously with the embedding of process block 816 by placing the densified bamboo pieces within the base material to form the desired arrangement prior to hardening or curing. Moreover, although FIG. 8 illustrates a particular order for blocks 202-204, 806-816 of method 800, embodiments of the disclosed subject matter are not limited thereto. Indeed, in certain embodiments, the blocks may occur in a different order than illustrated or simultaneously with other blocks.

Figure 9A:
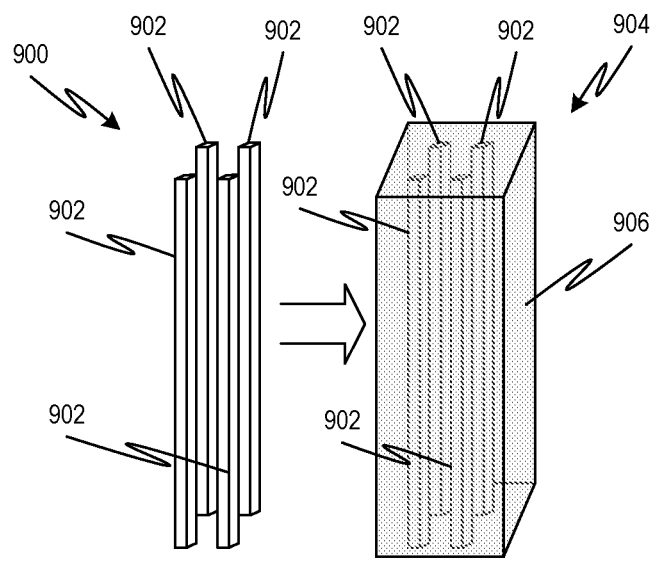
FIG. 9A is a simplified schematic illustration of an exemplary fabrication of a bamboo composite, according to one or more embodiments of the disclosed technology.

Referring now to FIG. 9A, an exemplary fabrication process for forming a bamboo-reinforced composite structure is shown. A plurality of densified bamboo segments 902 (e.g., elongated rod with a circular or annular cross-section, an elongated bar with a rectangular cross-section, or any other shape) can be prepared, for example, as described above with respect to any of FIGS. 2-3C. The densified bamboo segments 902 can be disposed within a mold or concrete form in a desired arrangement 900, for example, with segments 902 evenly spaced from and extending parallel to each other. The base material 906 (e.g., concrete and/or polymer(s)) can be added to the mold or concrete form to at least partially envelope, and preferably completely enclose, the arrangement 900. The base material 906 can then harden or be allowed to cure, thereby forming the composite structure 904 with bamboo segments 902 embedded therein. Although a particular bamboo shape, arrangement, and embedding technique have been illustrated in FIG. 9A, other bamboo shapes (whether solid or hollow), arrangements (whether regular, irregular, or random), and embedding techniques are also possible in some embodiments. Accordingly, embodiments of the disclosed subject matter are not limited to the specific shapes, arrangement, and embedding technique illustrated.

Figure 9B:
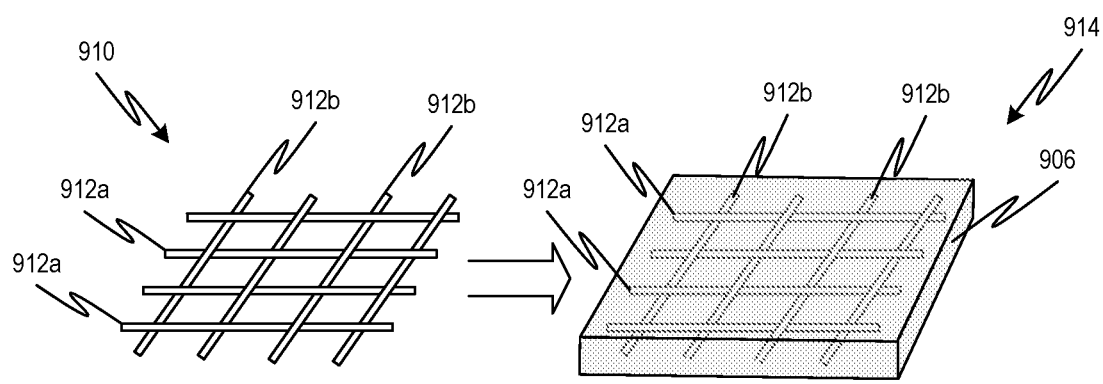
FIG. 9B is a simplified schematic illustration of another exemplary fabrication of a bamboo composite, according to one or more embodiments of the disclosed technology.

Referring to FIG. 9B, another exemplary fabrication process for forming a bamboo-reinforced composite structure is shown. A plurality of densified bamboo segments 912 (e.g., elongated rod with a circular or annular cross-section, an elongated bar with a rectangular cross-section, or any other shape) can be prepared, for example, as described above with respect to any of FIGS. 2-3C. The densified bamboo segments 912 can be disposed within a mold or concrete form in a desired arrangement 910. For example, segments 912*a* can be arranged evenly spaced from and extending parallel to each other along a first direction, while segments 912*b* can be arranged evenly spaced from and extending parallel to each other along a second direction perpendicular to the first direction. In the illustrated embodiment of FIG. 9B, segments 912*a*, 912*b* are also interwoven with each other. In some embodiments, the spacing between adjacent segments can be reduced from that illustrated in FIG. 9B, for example, to produce a tighter woven matrix with reduced or eliminated spacing between segments. The base material 906 (e.g., concrete and/or polymer(s)) can be added to the mold or concrete form to at least partially envelope, and preferably completely enclose, the arrangement 910. The base material 906 can then harden or be allowed to cure, thereby forming the composite structure 914 with woven bamboo matrix embedded therein. Although a particular bamboo shape, arrangement, and embedding technique have been illustrated in FIG. 9B, other bamboo shapes (whether solid or hollow), arrangements (whether regular, irregular, or random), and embedding techniques are also possible in some embodiments. Accordingly, embodiments of the disclosed subject matter are not limited to the specific shapes, arrangement, and embedding technique illustrated.

Figure 9C:
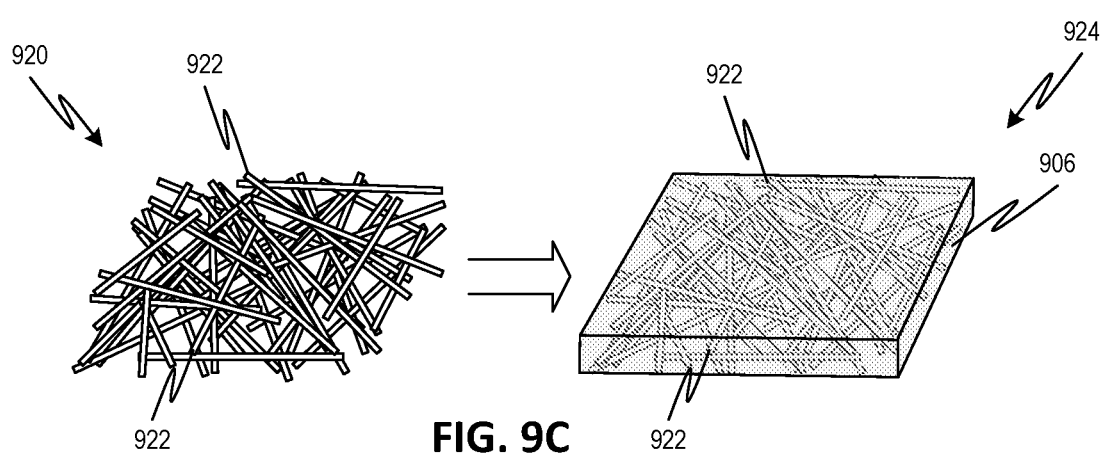
FIG. 9C is a simplified schematic illustration of yet another exemplary fabrication of a bamboo composite, according to one or more embodiments of the disclosed technology.

Referring to FIG. 9C, another exemplary fabrication process for forming a bamboo-reinforced composite structure is shown. A plurality of densified bamboo segments 922 (e.g., elongated rod with a circular or annular cross-section, an elongated bar with a rectangular cross-section, or any other shape) can be prepared, for example, as described above with respect to any of FIGS. 2-3C. The densified bamboo segments 922 can be disposed within a mold or concrete form in a random arrangement 920. In the illustrated embodiment of FIG. 9C, portions of segments 922 can be in contact with adjacent portions of segments 922. In some embodiments, the arrangement 920 may result in overlap between portions of segments 922 in plan view even though the segments 922 may not necessarily be in direct contact with each other (e.g., separated from each other by intervening base material). The base material 906 (e.g., concrete and/or polymer(s)) can be added to the mold or concrete form to at least partially envelope, and preferably completely enclose, the arrangement 920. The base material 906 can then harden or be allowed to cure, thereby forming the composite structure 924 with randomly-oriented bamboo segments embedded therein. Although a particular bamboo shape, arrangement, and embedding technique have been illustrated in FIG. 9C, other bamboo shapes (whether solid or hollow), arrangements (whether regular, irregular, or random), and embedding techniques are also possible in some embodiments. Accordingly, embodiments of the disclosed subject matter are not limited to the specific shapes, arrangement, and embedding technique illustrated.

Figure 10:
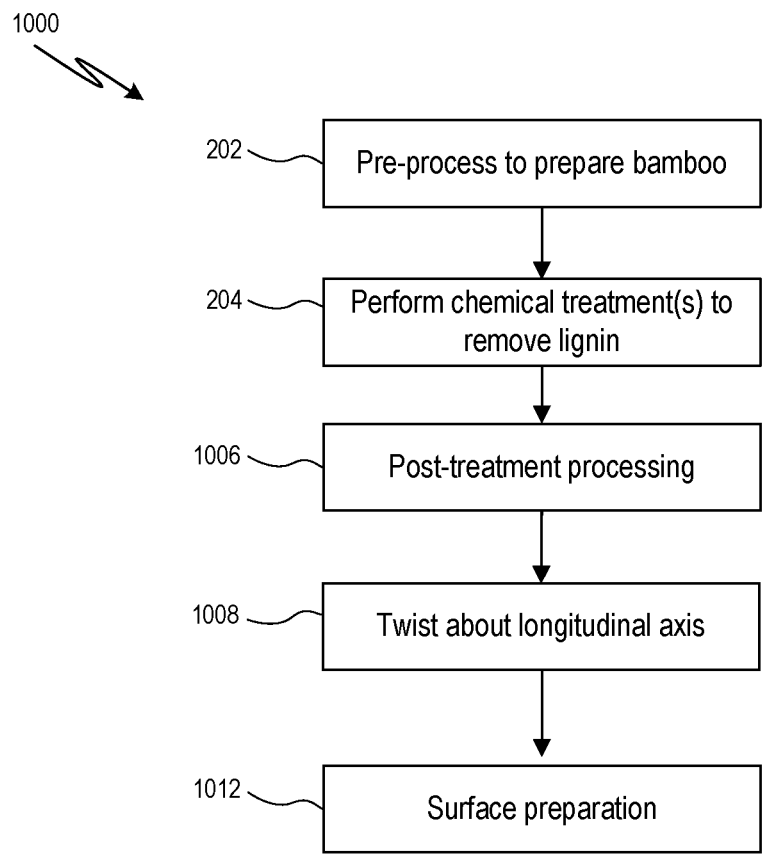
FIG. 10 is an exemplary process flow diagram for fabricating a bamboo fiber or rope, according to one or more embodiments of the disclosed technology.

In some embodiments, instead of densification via pressing, the chemically-treated bamboo segments can be compacted upon itself via twisting or folding. For example, FIG. 10 shows a generalized method 1000 for forming a bamboo fiber by twisting a chemically treated bamboo segment. Similar to method 200 of FIG. 2, method 1000 can include process block 202 (pre-processing) followed by process block 204 (one or more chemical treatments to remove at least some lignin).

After process block 204, the method 1000 can proceed to process block 1006, where optional post-treatment processing is performed. In some embodiments, post-treatment processing can include internal modification similar to that described above for process block 216 in method 200 of FIG. 2. For example, the chemically-treated bamboo segment can be infiltrated with one or more polymers (or polymer precursors), such as but not limited to epoxy resin, PVA, PEO, PA, PET, PBT, PTT, PAN, PA6, PMIA, PPTA, PU, PC, PP, HDPE, PS, PCL, PBS, PBAT, PB SA, PHB, PHBV, PGA, PPy, PTh, PVDF, PVF, EVOH, PVDC, MXD6, PE, PVC, PMMA, ABS, PI, PEI, PLA, OTS, POSS, PMS, PDMS, PEN, ABSM, DTMS, rosin, chitin, chitosan, protain, plant oil, lignin, hemicellulose, carboxymethyle cellulose, cellulose acetate, starch, agar, or any combination of the above.

Alternatively or additionally, in some embodiments when the amount of lignin removed from the bamboo by the chemical treatment is relatively low (e.g., removing 10% or less), the post-treatment processing of process block 1006 can include a softening treatment to allow the bamboo to twist without breaking. For example, the softening treatment can include exposing the chemically-treated bamboo segment to high-pressure steam (e.g., steam at a temperature above 130° C. (e.g., 160-180° C., inclusive) and at a pressure above ambient (e.g., 6-10 bar, inclusive)) for at least one minute (e.g., ~8-10 minutes, inclusive). In some embodiments where the lignin removal is greater (e.g., 40% or more), such softening treatment may not be necessary but can optionally be applied.

Figure 11:
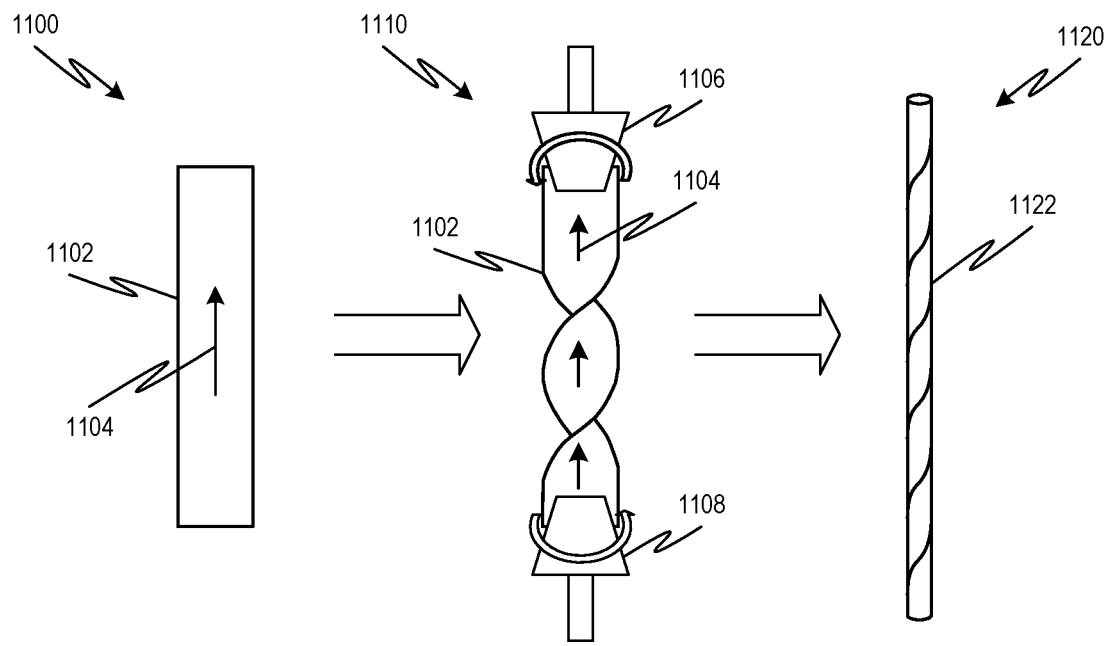
FIG. 11 is a simplified schematic illustration of an exemplary fabrication of a twisted bamboo fiber, according to one or more embodiments of the disclosed technology.

After any post-treatment processing, the method 1000 can proceed to process block 1008, where compaction of the bamboo segment to form a fiber is performed by twisting. For example, FIG. 11 shows, at 1100, a chemically-treated bamboo segment 1102 with longitudinal direction 1104. As shown at 1110, the bamboo segment 1102 can be grasped at opposite ends with respect to longitudinal direction 1104, for example, by an upper jig 1106 and a lower jig 1108. In some embodiments, the upper jig 1106 rotates about longitudinal direction 1104, and the lower jig 1108 rotates in an opposite direction about longitudinal direction 1104. Alternatively, in some embodiments, only one of jigs 1106, 1108 rotates while the other jig remains stationary. Alternatively, instead of jigs 1106, 1108, the bamboo segment 1102 can be twisted by any other rotational mechanism or by hand. The rotation can be effective to twist the bamboo segment upon itself, which rotation is continued until a desired final twisted fiber or rope structure 1122 is produced at 1120. After the twisting process, the well-aligned cellulose fibers of the chemically treated bamboo can be preserved, while the microchannels in the chemically-treated bamboo are forced to collapse by the twisting, thereby resulting in a dense structure with numerous intertwined curved cell walls without otherwise pressing.

Returning to FIG. 10, after the twisting in process block 1008, the method 1000 can proceed to process block 1012, where the twisted bamboo structure is optionally subjected to a surface preparation. In some embodiments, the surface preparation can include external modification similar to that described above for process block 226 in method 200 of FIG. 2. For example, the surface preparation can include applying a hydrophobic polymer coating to the twisted bamboo.

Although particular bamboo shapes and fabrication techniques have been illustrated in FIG. 11, other shapes (whether solid or hollow) and fabrication techniques are also possible according to one or more contemplated embodiments. Accordingly, the bamboo shapes and fabrication techniques are not limited to those specifically illustrated. Moreover, although rinsing, water removal, and drying have not been illustrated in FIG. 10 or explicitly discussed in method 1000, this method can be readily modified to include rinsing, water removal, and/or drying, for example, as described above with respect to method 200 of FIG. 2.

Although blocks 202-204, 1006-1012 of method 1000 have been described as being performed once, in some embodiments, multiple repetitions of a particular process block may be employed before proceeding to the next process block. In addition, blocks 202-204, 1006-1012 of method 1000 have been separately illustrated in FIGS. 10, in some embodiments, process blocks may be combined and performed together (simultaneously or sequentially). Moreover, although FIG. 10 illustrates a particular order for blocks 202-204, 1006-1012 of method 1000, embodiments of the disclosed subject matter are not limited thereto. Indeed, in certain embodiments, the blocks may occur in a different order than illustrated or simultaneously with other blocks.

EXAMPLES

Example 1

Figure 12:
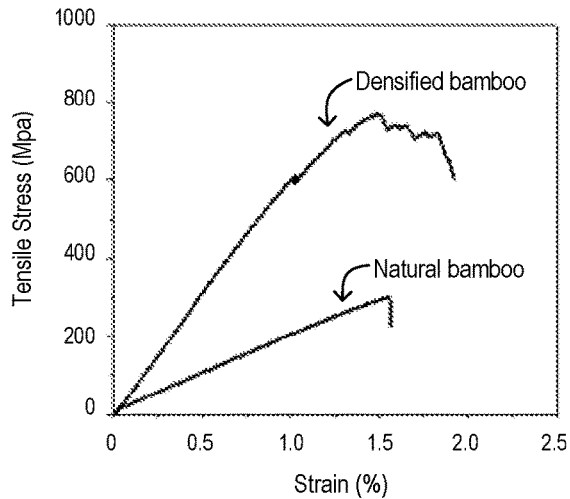
FIG. 12 is a graph of tensile stress versus strain for natural bamboo and modified bamboo fabricated according to a first example of the disclosed technology.

Five-year-old bamboo (Phyllostachys heterocycla) culms with node (length of ~100 cm and radius of ~10 cm) were prepared by making a linear cut (along its longitudinal direction), removing the inside node sections (nodal diaphragm), softening with high-pressure steam (at 140° C. for 8 minutes), and then flattening with a horizontal pressing apparatus (at a pressure of ~150 kg/cm$^2$) to form a flattened bamboo bulk (e.g., bamboo sheet). The flattened bamboo bulk was subsequently chemically treated by immersing in a heated solution of 2.5M NaOH and 0.4M $Na_2SO_3$ for 10 hours. The chemical treatment was effective to remove about 40-50% of lignin and about 60-80% of hemicellulose from the bamboo bulk. The chemically-treated bamboo bulk was then subjected to hot-pressing at a temperature of 105° C. and a pressure of ~3-5 MPa for ~2-4 hours. The pressing was in a direction perpendicular to the longitudinal direction (e.g., the bamboo growth direction) of the bamboo bulk. The resulting densified bamboo bulk has a thickness that was about 30% reduced as compared to its thickness prior to pressing, with parenchymal cells, vessels and lumen therein fully compressed. As shown in the graph of FIG. 12, the as-fabricated densified bamboo exhibits a high tensile strength of 700 MPa, higher than many natural materials, synthetic polymers, and even some metals and alloys.

Example 2

A natural bamboo culm was prepared by making a linear cut (along its longitudinal direction), removing the inside node sections (nodal diaphragm), softening with high-pressure steam (at 140° C. for 8 minutes), and then flattening with a horizontal pressing apparatus (at a pressure of ~150 kg/cm$^2$) to form a flattened bamboo bulk (e.g., bamboo sheet). The bamboo bulk was further cut along the longitudinal direction into individual strips, each having dimensions of ~100 mm by ~50 mm by ~5 mm. The bamboo strips were subsequently chemically treated by immersing in a boiling solution of 2.5M NaOH and 0.4M $Na_2SO_3$ for 12 hours. The chemical treatment was effective to remove about 50-65% of lignin from the bamboo strip, and the chemically-treated bamboo had pores therein ranging from 100 nm to 500 μm. The chemically-treated bamboo strip was then immersed in a PVA solution (100 g/L) and subjected to vacuum to encourage infiltration of the polymer (epoxy) into the pores bamboo strips. The polymer-infiltrated bamboo was then subjected to hot-pressing at temperature of 100° C. and a pressure of 5 MPa for ~24 hours. The pressing was in a direction perpendicular to the longitudinal direction (e.g., the bamboo growth direction) of the bamboo strip. The resulting epoxy-infiltrated bamboo composite exhibited a higher ductility (toughness up to 97.5 kJ/m$^2$) than the natural bamboo (45.3 kJ/m$^2$). Moreover, while the epoxy alone has a tensile strength of about 98 MPa and the natural bamboo has a tensile strength of about 300 MPa, the epoxy-infiltrated bamboo composite exhibits a tensile strength of ~410 MPa, higher than either of its constituent materials.

Example 3

Figure 13:
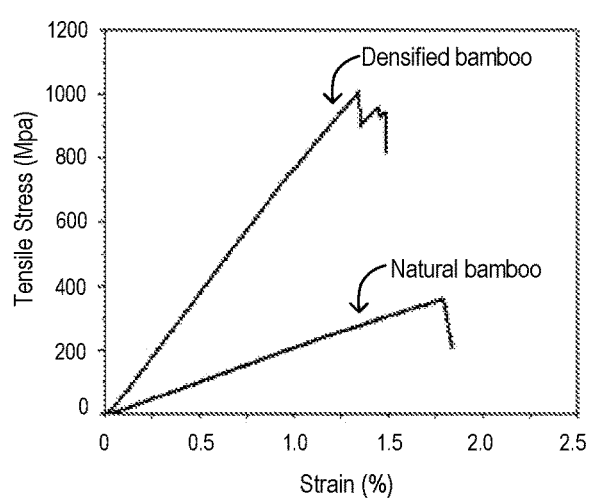
FIG. 13 is a graph of tensile stress versus strain for natural bamboo and modified bamboo fabricated according to a third example of the disclosed technology.

A natural bamboo culm was prepared by making a linear cut (along its longitudinal direction), removing the inside node sections (nodal diaphragm), softening with high-pressure steam (at 140° C. for 8 minutes), and then flattening with a horizontal pressing apparatus (at a pressure of ~150 kg/cm$^2$) to form a flattened bamboo bulk (e.g., bamboo sheet). The bamboo bulk was further cut along the longitudinal direction using a miter saw to form a series of bamboo strips. The bamboo strips were subsequently chemically treated by immersing in a boiling solution of 2.5M NaOH and 0.4M $Na_2SO_3$ for 12 hours. The chemical treatment was effective to remove about 50-65% of lignin from the bamboo strip. Without any intermediate drying step, the chemically-treated bamboo strip was then subjected to hot-pressing at a temperature of 100° C. and a pressure of 51 MPa for ~2-4 hours. The pressing was in a direction perpendicular to the longitudinal direction (e.g., the bamboo growth direction) of the bamboo strip. The resulting densified bamboo strip had densely packed cell walls. As shown in the graph of FIG. 13, the as-fabricated densified bamboo strip also results in an improved tensile strength of 1050 MPa, as compared to 300 MPa for natural bamboo.

Example 4

Natural bamboo was cut horizontally (along the radial direction) to yield a tube of the length of 3 m. The bamboo tube was then cut linearly (along the longitudinal direction) into two semi-circular halves. Each semi-circular half was processed by a cutting machine (e.g., a fluffing machine or dicer), that cut the bamboo along its longitudinal direction to form a series of linear bamboo fiber bundles (e.g., strips with narrow cross-sections). The linear fiber bundles were subsequently chemically treated by immersing in a boiling solution of 2.5M NaOH and 0.4M $Na_2SO_3$ for 12 hours. The chemical treatment was effective to remove a least some, but not all, of the lignin from each linear bamboo fiber bundle. The chemically-treated bamboo fiber bundle was then immersed in a polymer solution of melamine formaldehyde resin and subjected to vacuum to encourage infiltration of the polymer into the bamboo. After the immersion and to remove any excess moisture that may have been absorbed by the bamboo after the chemical treatment, the polymer-impregnated bamboo fiber bundle was dried in an oven at 60° C. until a final moisture content of 10% w/w was achieved. Composites were fabricated by compression molding technology, with bamboo fiber bundles assembled along the longitudinal direction in a mold and subjected to hot-pressing at a temperature of 100° C. and a pressure of 6.0 MPa for ~24 hours. The resulting bamboo fiber-polymer composite has a higher density than natural bamboo (e.g., 1.4 $g/cm^3$ for the composite versus 0.8 $g/cm^3$ for the natural bamboo), as well as higher tensile strength, modulus, and toughness.

Example 5

A natural bamboo culm was prepared by making a linear cut (along its longitudinal direction), removing the inside node sections (nodal diaphragm), softening with high-pressure steam (at 140° C. for 8 minutes), and then flattening with a horizontal pressing apparatus (at a pressure of ~150 $kg/cm^2$) to form a flattened bamboo bulk (e.g., bamboo sheet). The bamboo bulk was further cut along the longitudinal direction using a miter saw to form a series of rectangular bamboo bars. The bars had a width of ~10-20 cm, a length of ~20-50 cm, and a thickness of 0.3-0.5 cm. The bamboo bars were subsequently chemically treated by immersing in an alkaline solution, resulting in removal of ~40-50% of lignin and ~60-80% of hemicellulose from the bamboo bars. The chemically-treated bamboo bars were then immersed in DI water to remove any chemical remnants prior to further processing.

Figure 14:
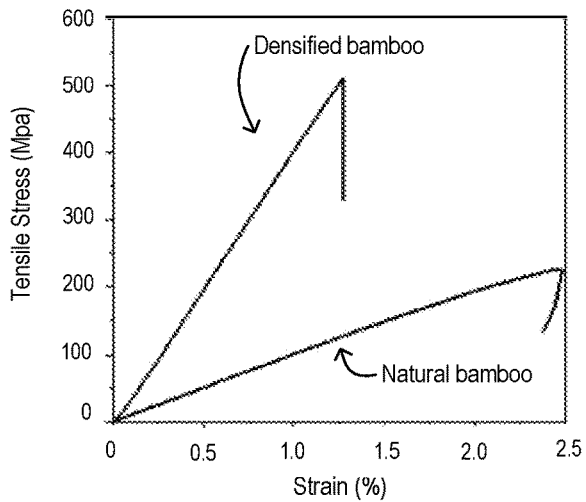
FIG. 14 is a graph of tensile stress versus strain for natural bamboo and modified bamboo fabricated according to a fifth example of the disclosed technology.

Using three, five, or seven of the chemically-treated bamboo bars coupled together, a laminated bamboo lumber was prepared. The chemically-treated bamboo bars were arranged with the longitudinal directions of facing bars at a 90° angle with respect to each other, and the facing surfaces were cross-linked together, for example, by coating a facing surface of one or both bars with urea-formaldehyde, resorcinol-formaldehyde, or another glue and contacting the facing surfaces together. The arrangement of coupled bamboo bars was then subjected to hot-pressing at a temperature of ~100-120° C. and a pressure of ~5 MPa for ~6 hours. The resulting laminated bamboo lumber exhibits a substantially enhanced tensile strength of 500 MPa, as shown in FIG. 14.

Example 6

A natural bamboo culm was cut along its longitudinal direction into bamboo strips. The bamboo strips were subsequently chemically treated by immersing in a boiling solution of 2.5M NaOH and 0.4M $Na_2SO_3$ for 10 hours. The chemical treatment was effective to remove about 50% of lignin from the bamboo strip. The chemically-treated bamboo stripes were then washed in DI water to remove any chemical remnants prior to further processing. Each chemically-treated bamboo strip was then subjected to hot-pressing at a temperature of 100° C. and a pressure of 5 MPa for ~1-2 hours. The pressing was in a direction perpendicular to the longitudinal direction (e.g., the bamboo growth direction) of the bamboo strip. Then the densified bamboo strips were coated with a hydrophobic polymer.

The resulting polymer-coated, densified bamboo strips were then used to form a bamboo-reinforced composite. The polymer-coated, densified bamboo strips were woven into a layered structure, similar to that shown in FIG. 9B and then placed into a mold with a concrete material. The bamboo strip arrangement and concrete within the mold were then subjected to hot-pressing at a temperature of 100° C. and a pressure of 5 MPa. The resulting dense bamboo-reinforced composite structure exhibits improved mechanical robustness as compared to other concrete composites, by virtue of the interwoven, strong bamboo strips embedded therein.

Example 7

Figure 15:
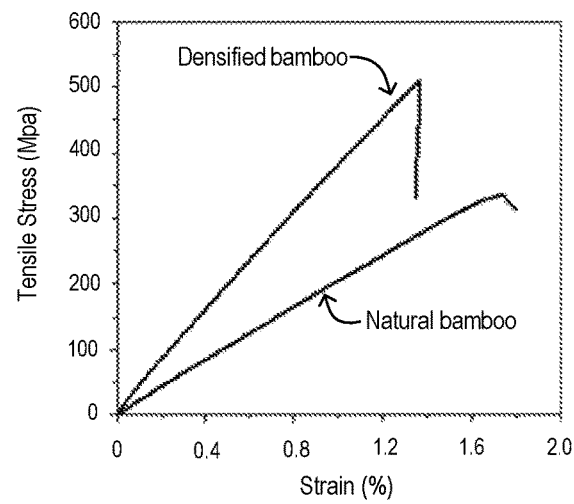
FIG. 15 is a graph of tensile stress versus strain for natural bamboo and modified bamboo fabricated according to a seventh example of the disclosed technology.

A natural round bamboo culm (Moso) was chemically treated by immersing in a boiling solution of 2.5M NaOH and 0.4M $Na_2SO_3$ for less than 4 hours. The chemical treatment was effective to remove about 10-25% of lignin from the bamboo culm. The chemically-treated bamboo culm was then washed in DI water to remove any chemical remnants prior to further processing. The chemically-treated bamboo culm was then dried in an oven at a temperature of 50° C. The resulting modified bamboo structure retained the overall structure of the natural bamboo culm, but the partial lignin removal coupled with the drying resulted in an increase in mechanical tensile strength from 340 MPa for the natural bamboo to over 500 MPa, as shown in FIG. 15.

Example 8

A natural round bamboo culm was chemically treated by immersing in a boiling solution of 2.5M NaOH and 0.4M $Na_2SO_3$ for about 1 hour. The chemical treatment was effective to remove about 3-5% of lignin from the bamboo culm. The chemically-treated bamboo culm was then washed in DI water to remove any chemical remnants prior to further processing. After the washing, the chemically-treated bamboo culm was preserved in ethanol for 48 hours in order to remove any moisture within the culm prior to polymer infiltration. The chemically-treated bamboo culm was then immersed in a mixed solution containing polymer precursors—a hydrophobic polymer Bisphenol A epoxy resin (E51) as a matrix and a liquid aromatic diamine (H-256) as a hardening agent. The ratio of matrix to hardening agent in the solution was 10:1. The chemically-treated bamboo culm was immersed in the mixed solution and subjected to vacuum for ~1 hour to encourage infiltration of the epoxy into the bamboo culm. The epoxy-infiltrated bamboo was then subjected to air-drying to yield the final composite structure.

Example 9

Basswood strips were chemically treated by immersing in a solution of 2.5M NaOH and 0.4M $Na_2SO_3$ for about 8 hours. The chemical treatment was effective to remove about 40-50% of lignin from the wood strips. The wood strips had a moisture content of ~20-30 wt % and were twisted by hand in opposite directions. The twisted strips were subsequently dried in air to yield the final twisted wood fiber. The twisted wood fibers demonstrate a mechanical strength of ~450 MPa, nearly eight times higher than the mechanical strength of the constituent material (56 MPa). Similar or increased performance is expected when bamboo strips are used in place of wood to form twisted bamboo fibers.

Example 10

Natural round bamboo culm was chemically treated by immersing in a solution of 2.5M NaOH and 0.4M $Na_2SO_3$ for about 2 hours. The chemical treatment was effective to remove about 6-10% of lignin from the bamboo culm. The chemically-treated bamboo culm was then washed in DI water to remove any chemical remnants prior to further processing. The chemically-treated bamboo culm was then subjected to a further chemical treatment, by immersing in a bleaching solution of 2.5M $H_2O_2$ at temperature of ~60-70° C. (via an oven) for ~48-72 hour. During the further chemical treatment, the bleaching solution is not stirred to avoid unintended disruption to the microstructure of the culm. The further chemical treatment was stopped once the yellow color of the culm has completely disappeared, after which the bleached bamboo culm was carefully rinsed in cold DI water. After the washing, the bleached bamboo culm was preserved in ethanol for 48 hours in order to remove any moisture within the culm prior to polymer infiltration. The bleached bamboo culm was then immersed in a mixed solution containing polymer precursors—a hydrophobic polymer Bisphenol A epoxy resin (E51) as a matrix and a liquid aromatic diamine (H-256) as a hardening agent. The ratio of matrix to hardening agent in the solution was 2:1. The chemically-treated bamboo culm was immersed in the mixed solution and subjected to vacuum for ~1 hour to encourage infiltration of the epoxy resin into the bamboo culm and then maintained at a static temperature of 30° C. and ambient pressure for 12 hours. Once the resin had completely solidified, the resulting bamboo composite had a substantially transparent appearance.

Example 11

Figure 16A:
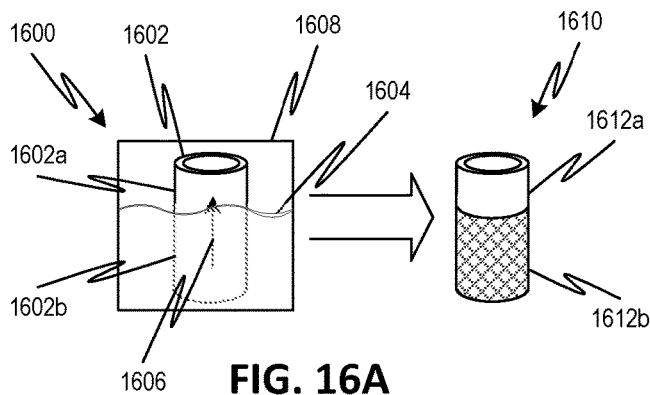
FIG. 16A is a simplified schematic illustration of an exemplary fabrication of a bamboo structure, according to one or more embodiments of the disclosed technology.

Natural round bamboo culm was chemically treated by immersing in a solution of 2.5M NaOH and 0.4M $Na_2SO_3$ for about 4 hours. The chemical treatment was effective to remove about 25-30% of lignin from the bamboo culm. For example, as shown by the setup 1600 in FIG. 16A, a bottom portion 1602b of the chemically-treated bamboo culm 1602 was then subjected to a further chemical treatment, by immersing in a bleaching solution 1604 of 2.5M $H_2O_2$ at temperature of ~60-70° C. (via an oven) for ~48-72 hour. During the further chemical treatment, the top portion 1602a, including a node, remains outside the bleaching solution 1604 within container 1608 and thus is unaffected by the further treatment. The further chemical treatment was stopped once the yellow color of the bottom culm portion 1602b has completely disappeared, after which the bamboo culm was dried in air. The chemical treatments thus yield a blended structure 1610, with a top section 1612a having a higher lignin concentration than the bottom section 1612b and with lumina extending along the longitudinal direction 1606 between sections 1612a, 1612b.

Figure 16B:
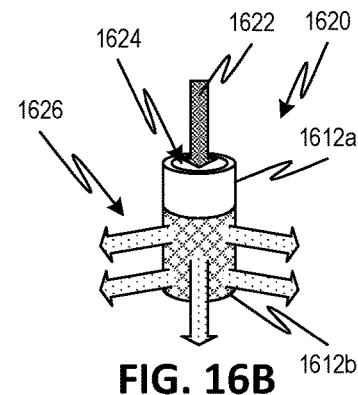
FIG. 16B is a simplified schematic illustration of a bamboo structure operating as a water filter, according to an eighth example of the disclosed technology.

The bottom section 1612b may also have a more porous microstructure, which can be used in some embodiments to provide filtration. For example, FIG. 16B illustrates an exemplary configuration of a chemically-treated blended bamboo structure 1620 adapted for use as a water filtration device, where water to be filtered 1622 enters into conduit 1624 formed by culm wall of the top section 1612a. The bottom section 1612b has fiber bundles aligned along the longitudinal direction with a spacing between adjacent fiber bundles being about 10-50 µm. As the water flows through the spacing between these adjacent fiber bundles, hazardous compounds, such as heavy metal ions (e.g., copper, cadmium, manganese, etc.) and dyes, can be adsorbed by the cellulose fiber bundles. The water 1626 exiting through the culm wall of the bottom section 1612b can thus be filtered by the fiber bundles.

Example 12

Five-year-old slender crookstem bamboo (Phyllostachys Bambusoides) stems were chemically treated by immersing in a solution of 2.5M NaOH and 0.4M $Na_2SO_3$ for about 4 hours. The chemical treatment was effective to remove some, but not all, of lignin from the bamboo stems, resulting in a weight reduction of ~21.4 wt %. The chemically-treated bamboo stems were then immersed in boiling DI water several times to remove any chemical remnants prior to further processing. The chemically-treated bamboo stems, having a moisture content of ~70-80 wt %, were then placed in a 1200-W consumer microwave oven for irradiation of 30-60 minutes, depending on specimen size and heating power, to dry the stems.

Because the chemical treatment causes the bamboo to become more porous and softer, the subsequent microwave-heating process can quickly drive out the water in the bamboo structure and induce severe yet uniform shrinkage (e.g., 28.9%), leading to a dense (e.g., 1.00 g/cm³) yet integrated material with intertwined, densely packed cell walls. At a finer scale, the aligned cellulose nanofibrils in the cell walls were well preserved after the chemical treatment and microwave-drying process. The resulting dense, laminated structure (featuring long, strong cellulose nanofibrils aligned within the cell walls at the micro- and nanoscales) contributed to substantially improved mechanical properties, including nearly 2-times higher tensile strength, 3.2-times higher toughness, and 2-times higher flexural strength as compared to that of natural bamboo.

Figure 17A:
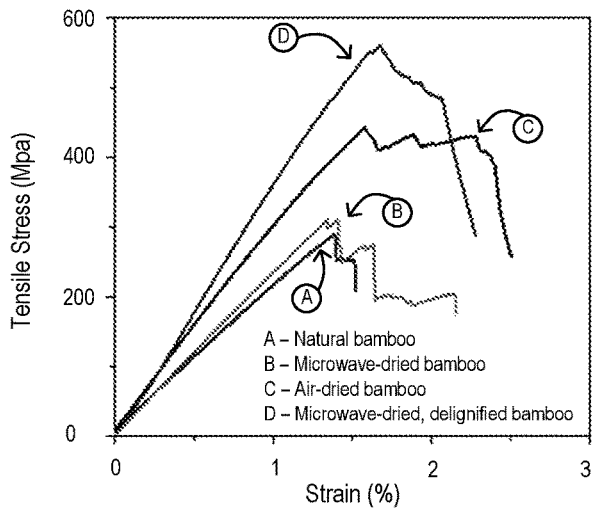
FIGS. 17A-17B are graphs of tensile stress versus strain and flexural stress versus displacement, respectively for natural bamboo, dried bamboo, and modified bamboo fabricated according to a twelfth example of the disclosed technology.

Mechanical tensile testing for the microwave-heated, chemically-treated bamboo structure was conducted, as well as for three control samples for comparison, in particular natural bamboo, microwave-heated natural bamboo, and air-dried chemically-treated bamboo. As shown in FIG. 17A, all four samples show linear tensile stress-strain curves with a small elongation of ~1.5%. However, the microwave-heated chemically-treated ("delignified") bamboo structure demonstrated the highest tensile strength of 560 MPa, a Young's modulus of 36.1 GPa, and work of fracture (i.e., tensile toughness) of 6.8 MJ/m$^3$, which are 1.9-times, 2.0-times, and 3.2-times higher than natural bamboo. In contrast, the directly microwave-heated natural bamboo (without chemical treatment) showed limited enhancements in tensile strength, Young's modulus, and work of fracture compared with natural bamboo, mainly due to the small shrinkage (or densification) of the bamboo structure without prior lignin removal. When the drying method was changed to air drying (using the same partially-delignified bamboo as the starting material), enhancements to tensile strength, Young's modulus, and work of fracture (by 1.5-times, 1.7-times, and 3.1-times, respectively) can be achieved, but at the risk of damage or cracking due to non-uniform shrinkage.

Figure 17B:
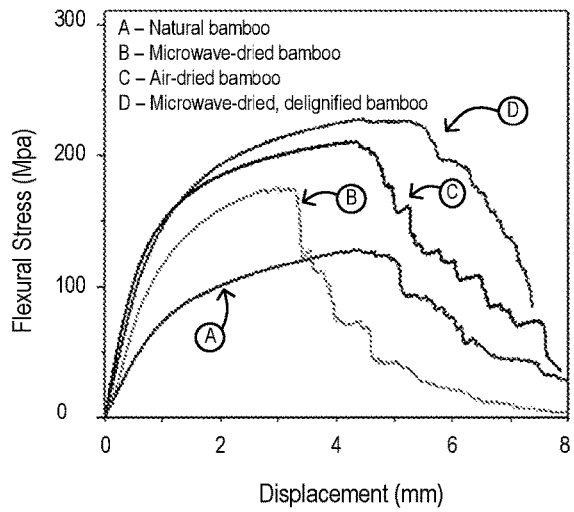

The excellent tensile properties of the microwave-heated, chemically-treated bamboo can be attributed to its dense, laminated structure. At the macroscale, the material is dense and less porous compared to natural bamboo due to the severe yet uniform shrinkage during microwave-heating. At the mesoscale, most of the open cells collapse due to the shrinkage, resulting in a laminated structure with densely packed cell walls. Additionally, at the micro- and nanoscale, the long, aligned cellulose fibrils of the cell walls are well preserved after treatment. Moreover, the partial removal of hemicelluloses and lignin exposes more surface area of the cellulose fibrils, which may enhance the interfibril interactions, thus improving the density of hydrogen bonding (via the numerous hydroxyl groups of cellulose molecular chains) and the collective van der Waals force. The reduction of defects after partial delignification and microwave-induced densification can also contributes to the better mechanical properties To assess the flexural properties, three-point bending tests were conducted on the microwave-heated, chemically-treated bamboo structure, as well as for the three control samples. As shown in FIG. 17B, the microwave-heated, chemically-treated bamboo again demonstrated the highest flexural strength (248 MPa) and Young's modulus (16.5 GPa), which were 2-times and ~4-times higher than natural bamboo, respectively. The air-dried, chemically-treated bamboo showed slightly lower mechanical strength than the microwave-heated, chemically-treated bamboo. However, microwave-heated natural bamboo (without chemical treatment) only showed moderate enhancement in the flexural strength, with the cost of a reduced displacement, suggesting that the combination of partial delignification and microwave-heating leads to the best flexural properties.

Example 13

Five-year-old slender crookstem bamboo (Phyllostachys Bambusoides) stems were prepared by making a linear cut (along its longitudinal direction), removing the inside node sections (nodal diaphragm), softening with high-pressure steam (at 140° C. for 8 minutes), and then flattening with a horizontal pressing apparatus (at a pressure of ~125 kg/cm$^2$) to form a flattened bamboo section. The bamboo section was then chemically treated by immersing in a solution of 2.5M NaOH and 0.4M Na$_2$SO$_3$ for about 12 hours. The chemical treatment was effective to remove some, but not all, of lignin from the bamboo section (see Table 1 below), resulting in a weight reduction of ~39.3 wt %. The chemically-treated bamboo section was then immersed in boiling DI water several times to remove any chemical remnants prior to further processing. The chemically-treated bamboo section was then subjected to hot-pressing at a temperature of 150° C. and a pressure of ~5 MPa for ~24 hours. The pressing was in a direction perpendicular to the longitudinal direction (e.g., the bamboo growth direction) of the bamboo bulk. The resulting densified bamboo bulk had an increased density (from ~0.80 g/cm$^3$ to ~1.32 g/cm$^3$) and is composed of dense fibers and collapsed parenchymatous cell walls.

TABLE 1

Comparison of bamboo before and after chemical treatment to remove lignin and densification

|  | Before | After |
|---|---|---|
| Cellulose (wt %) | ~45 | ~80 |
| Hemicellulose (wt %) | ~25 | ~11 |
| Lignin (wt %) | ~30 | ~9 |
| Density (g/cm$^3$) | ~0.8 | ~1.32 |

The densely packed cellulose fibers play a prominent role in defining the tensile properties of the densified bamboo, since the stiffness of cellulose fibrils (167.5 GPa) is much greater than that of hemicellulose (4.0 GPa) and lignin (2.0 GPa). By virtue of the chemical treatment, amorphous hemicellulose, lignin, pectin and waxy substances covering the external surface of the bamboo cellulose fibers can be removed, thereby providing a more uniform fiber surface with more exposed hydroxyl groups on the fiber surface and with a higher crystallinity as compared to natural bamboo. Thus, the densified bamboo can exhibit improved mechanical properties as compared to natural bamboo. A comparison of selected mechanical properties for natural bamboo and densified bamboo is shown in Table 2 below.

TABLE 2

Comparison of select mechanical properties for natural bamboo and densified bamboo

| Mechanical Property | Natural Bamboo | Densified bamboo | Change |
|---|---|---|---|
| Tensile Strength (MPa) | 298 | 770 | >2.5x increase |
| Tensile Module (GPa) | 19.2 | 59.6 | >3x increase |
| Flexural Strength (MPa) (orthogonal to longitudinal dir.) | 148 | 327 | >2x increase |
| Flexural Modulus (GPa) | 9.8 | 38.5 | >3.5x increase |

Figure 18A:
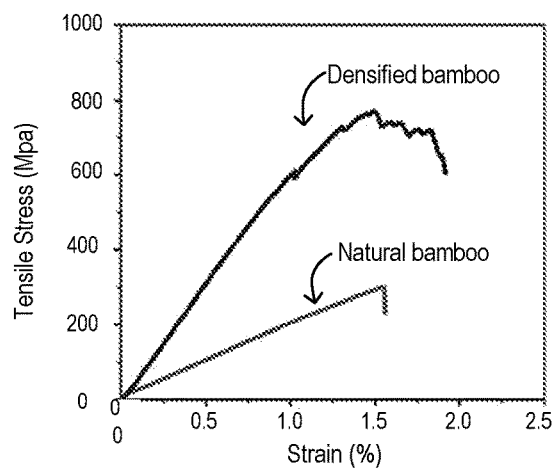
FIGS. 18A and 18C are graphs of tensile stress versus strain and flexural stress versus displacement, respectively for natural bamboo and modified bamboo fabricated according to a thirteenth example of the disclosed technology.
Figure 18B:
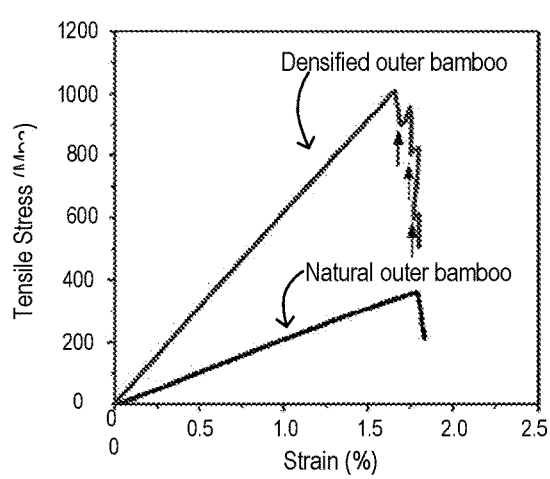
FIGS. 18B and 18D are graphs of tensile stress versus strain and flexural stress versus displacement, respectively for the outer culm of natural bamboo and the outer culm of modified bamboo fabricated according to a thirteenth example of the disclosed technology.

Tensile stress-strain curves for the densified bamboo as compared to the natural bamboo are shown in FIG. 18A. The natural bamboo showed linear deformation before tensile failure with a tensile strength of 298 MPa. Meanwhile, the densified bamboo initially exhibited linear behavior but became nonlinear once the stress exceeded the linear limit. Additionally, a significantly higher tensile strength of 770 MPa was obtained, which is 258% of that of natural bamboo. The densified bamboo also exhibited a 310% enhancement in the tensile modulus. The tensile strength of different portions of the bamboo samples was also investigated, in particular, by separating the natural bamboo into two parts along the radial direction—an inner region and an outer region. As shown in FIG. 18B, the tensile strength in the outer part of the natural bamboo is 361 MPa, while the densified outer bamboo demonstrates a record high tensile strength of 1.05 GPa. Meanwhile, inner bamboo and densified inner bamboo exhibited relatively lower tensile properties, 226 MPa and 745 MPa respectively.

Figure 18C:
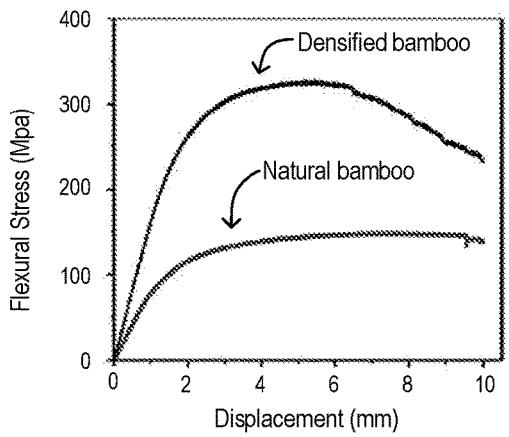
Figure 18D:
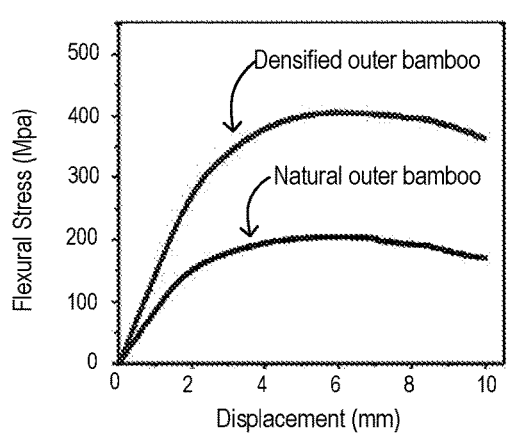

To assess the flexural properties along the longitudinal direction, three-point bending tests were conducted on the natural bamboo and densified bamboo samples. As shown in FIG. 18C, a large displacement was achieved in the natural bamboo specimens before failure, and the densified bamboo exhibited a wider linear regime in the course of increased loading. The flexural strength of the natural and densified bamboo was 148 MPa and 327 MPa, respectively. Unlike traditional structural materials, the densified bamboo demonstrated both substantially enhanced ultimate tensile strength and flexural strength, with 220% and 390% enhancement in the flexural strength and modulus, respectively, as compared to the natural bamboo. Additionally, the densified bamboo under large flexural deformation totally recovered after bending due to the high tensile strength of the aligned bamboo fibers. Both natural bamboo and densified bamboo samples show excellent durability after undergoing 100 bending cycles, suggesting the outstanding structural stability of the natural bamboo is maintained even after the densification process. As shown in FIG. 18D, the densified outer bamboo exhibited a higher flexural strength of 404 MPa and a modulus of 46.5 GPa, as the percentage of the fibers is higher in the outer part of bamboo.

The inclusion of the bamboo node in the densified structure may negatively impact the tensile strength of the final material, and thus may be removed in some embodiments. However, it was also found that inclusion of the bamboo node in the densified structure actually promoted the flexural strength. Thus, the node may be retained or removed depending on the contemplated final application for the densified bamboo.

Additional Examples of the Disclosed Technology

In view of the above described implementations of the disclosed subject matter, this application discloses the additional examples in the clauses enumerated below. It should be noted that one feature of a clause in isolation, or more than one feature of the clause taken in combination, and, optionally, in combination with one or more features of one or more further clauses are further examples also falling within the disclosure of this application.

Clause 1. A method, comprising: removing at least some lignin from a segment of bamboo via one or more chemical treatments.

Clause 2. The method of clause 1, wherein the one or more chemical treatments remove between 0.1% and 99%, inclusive, of lignin originally in the segment of bamboo.

Clause 3. The method of any one of clauses 1-2, wherein the one or more chemical treatments comprise immersing the segment in a solution of sodium hydroxide (NaOH), lithium hydroxide (LiOH), potassium hydroxide (KOH), sodium sulfite ($Na_2SO_3$), sodium sulfate ($Na_2SO_4$), sodium sulfide ($Na_2S$), $Na_nS$ wherein n is an integer, urea ($CH_4N_2O$), sodium bisulfite ($NaHSO_3$), sulfur dioxide ($SO_2$), anthraquinone ($C_{14}H_8O_2$), methanol ($CH_3OH$), ethanol ($C_2H_5OH$), butanol ($C_4H_9OH$), formic acid ($CH_2O_2$), hydrogen peroxide ($H_2O_2$), acetic acid ($CH_3COOH$), butyric acid ($C_4H_8O_2$), peroxyformic acid ($CH_2O_3$), peroxyacetic acid ($C_2H_4O_3$), ammonia ($NH_3$), tosylic acid (p-TsOH), sodium hypochlorite (NaClO), sodium chlorite ($NaClO_2$), chlorine dioxide ($ClO_2$), chorine ($Cl_2$), or any combination of the above.

Clause 4. The method of any one of clauses 1-3, wherein the one or more chemical treatments comprises immersing the segment in an alkaline solution.

Clause 5. The method of any one of clauses 1-4, wherein the one or more chemical treatments comprises immersing the segment of bamboo in a boiling solution of NaOH and $Na_2O_3$, for example, a solution of at least 0.25M NaOH (e.g., 0.5M NaOH) and at least 0.02M $Na_2O_3$ (e.g., 0.04M $Na_2O_3$) within a high pressure reactor at a temperature of 160° C. and a pressure of 6-8 bar for about one hour or more.

Clause 6. The method of clause 5, wherein the one or more chemical treatments comprises immersing the segment of bamboo in a second solution of $H_2O_2$, for example, a solution of 2.5M $H_2O_2$.

Clause 7. The method of any one of clauses 1-6, further comprising, prior to the removing, mechanically processing a natural bamboo section to form the segment of bamboo, the mechanically processing comprising:
cutting a slit in the natural bamboo section, the slit extending along a longitudinal direction of the natural bamboo section;
cutting a strip from the natural bamboo section for use as the segment;
removing an internal node portion from the natural bamboo section;
softening the natural bamboo section by exposing to steam;
flattening the natural bamboo section by horizontal pressing or cold rolling; or
any combination of the above.

Clause 8. The method of any one of clauses 1-7, further comprising, after the removing, modifying the chemically-treated segment of bamboo by:
forming or depositing non-native particles on internal surfaces of the segment, external surfaces of the segment, or on both internal and external surfaces of the segment;
infiltrating the segment with a polymer or a precursor of the polymer; or
any combination of the above.

Clause 9. The method of clause 8, wherein the non-native particles comprise hydrophobic nanoparticles, for example, silica ($SiO_2$) nanoparticles, and/or fire-resistant nanoparticles, for example, boron-nitride (BN) nanoparticles.

Clause 10. The method of any one of clauses 8-9, wherein the polymer comprises an epoxy resin, polyvinyl alcohol (PVA), polyethylene glycol (PEO), polyamide (PA), polyethylene terephthalate (PET), polybutylene terephthalate (PBT), polytrimethylene terephthalate (PTT), polyacrylonitrile (PAN), polycaprolactam (PA6), poly(m-phenylene isophthalamide) (PMIA), poly-p-phenylene terephthalamide (PPTA), polyurethane (PU), polycarbonate (PC), polypropylene (PP), high-density polyethylene (HDPE), polystyrene (PS), polycaprolactone (PCL), polybutylene succinate (PBS), polybutylene adipate terephthalate (PBAT), poly(butylene succinate-co-butylene adipate) (PB SA), polyhydroxybutyrate (PHB), poly(3-hydroxybutyrate-co-3-hydroxyvalerate) (PHBV), poly(glycolic acid) (PGA), polypyrrole (PPy), polythiophene (PTh), polyvinylidene fluoride (PVDF), polyvinyl fluoride (PVF), ethylene vinyl alcohol (EVOH), poly(vinylidene chloride) (PVDC), polyxylylene adipamide (MXD6), polyethylene (PE), polyvinyl chloride (PVC), poly(methyl methacrylate) (PMMA), acrylonitrile butadiene styrene (ABS), polyimide (PI), polyethylenimine (PEI), polylactic acid (PLA), octadecyltrichlorosilane (OTS), polyoctahedral silsesquioxane (POSS), paramethylstyrene (PMS), polydimethylsiloxane (PDMS), poly(ethylene naphthalate) (PEN), a graft copolymer of acrylonitrile-butadiene-styrene-methylmethacrylate (ABSM), dodecyltrimethoxysilane (DTMS), rosin, chitin, chitosan, protain, plant oil, lignin, hemicellulose, carboxymethyl cellulose, cellulose acetate, starch, agar, or any combination of the above.

Clause 11. The method of any one of clauses 1-10, further comprising, after the removing, pressing the chemically-treated segment of bamboo in a direction crossing a longitudinal direction of the bamboo section, such that natural lumina originally in the segment of bamboo at least partially collapse.

Clause 12. The method of clause 11, wherein the pressing is performed with the segment of bamboo at a temperature between 20° C. and 140° C., inclusive, and subject to a pressure between 0.5 MPa and 10 MPa, inclusive.

Clause 13. The method of any one of clauses 11-12, wherein the pressing is in a range of 1-180 minutes, inclusive.

Clause 14. The method of any one of clauses 11-13, wherein a thickness of the chemically-treated segment after the pressing is 30% or less than a thickness of the chemically-treated segment before the pressing.

Clause 15. The method of any one of clauses 11-14, further comprising, prior to the pressing:
removing at least some lignin from a second segment of bamboo via one or more chemical treatments; and
disposing the chemically-treated segments of bamboo into contact with each other
wherein the pressing is performed on both segments simultaneously.

Clause 16. The method of clause 15, wherein the chemically-treated segments of bamboo are disposed such that longitudinal directions of the segments cross each other, for example, substantially perpendicular to each other or at least at a non-zero angle with respect to each other (e.g., when viewed in a plan view).

Clause 17. The method of any one of clauses 1-16, further comprising, after the removing, drying the chemically-treated segment of bamboo.

Clause 18. The method of clause 17, wherein the drying comprises a microwave drying process, a pressing process, a vacuum-assisted drying process, an oven drying process, an air-drying process, a freeze-drying process, a critical point drying process, or any combination thereof.

Clause 19. The method of any one of clauses 1-18, further comprising, after the removing, twisting the pressed, chemically-treated segment about an axis substantially parallel to its longitudinal direction to form a twisted fiber or rope structure.

Clause 20. The method of any one of clauses 1-19, wherein, after the removing, a natural bamboo section extends from the chemically-treated segment of bamboo, the natural bamboo section having a greater lignin content (wt %) than that of the chemically-treated segment of bamboo.

Clause 21. A method comprising:
removing at least some lignin from a plurality of segments of bamboo via one or more chemical treatments;
pressing each chemically-treated segment of bamboo in a direction crossing a longitudinal direction of the respective segment, such that natural lumina originally in the respective segment at least partially collapse; and
embedding the plurality of pressed, chemically-treated segments of bamboo within a base material to form a composite.

Clause 22. The method of clause 21, wherein the base material comprises concrete or a polymer.

Clause 23. The method of clause 22, wherein the polymer comprises an epoxy resin, polyvinyl alcohol (PVA), polyethylene glycol (PEO), polyamide (PA), polyethylene terephthalate (PET), polybutylene terephthalate (PBT), polytrimethylene terephthalate (PTT), polyacrylonitrile (PAN), polycaprolactam (PA6), poly(m-phenylene isophthalamide) (PMIA), poly-p-phenylene terephthalamide (PPTA), polyurethane (PU), polycarbonate (PC), polypropylene (PP), high-density polyethylene (HDPE), polystyrene (PS), polycaprolactone (PCL), polybutylene succinate (PBS), polybutylene adipate terephthalate (PBAT), poly(butylene succinate-co-butylene adipate) (PBSA), polyhydroxybutyrate (PHB), poly(3-hydroxybutyrate-co-3-hydroxyvalerate) (PHBV), poly(glycolic acid) (PGA), polypyrrole (PPy), polythiophene (PTh), polyvinylidene fluoride (PVDF), polyvinyl fluoride (PVF), ethylene vinyl alcohol (EVOH), poly(vinylidene chloride) (PVDC), polyxylylene adipamide (MXD6), polyethylene (PE), polyvinyl chloride (PVC), poly(methyl methacrylate) (PMMA), acrylonitrile butadiene styrene (ABS), polyimide (PI), polyethylenimine (PEI), polylactic acid (PLA), octadecyltrichlorosilane (OTS), polyoctahedral silsesquioxane (POSS), paramethylstyrene (PMS), polydimethylsiloxane (PDMS), poly(ethylene naphthalate) (PEN), a graft copolymer of acrylonitrile-butadiene-styrene-methylmethacrylate (ABSM), dodecyltrimethoxysilane (DTMS), rosin, chitin, chitosan, protain, plant oil, lignin, hemicellulose, carboxymethyl cellulose, cellulose acetate, starch, agar, or any combination of the above.

Clause 24. The method of any one of clauses 22-23, wherein the concrete comprises fly ash, blast furnace slag, waste paper, glass, plastic waste, rice husk ash, corn cob ash, sawdust ash, fly ash, palm oil fuel ash, silica fume (or microsilica), or any combination thereof.

Clause 25. The method of any one of clauses 21-24, wherein each pressed, chemically-treated segment has a strip shape (e.g., elongated bar with a rectangular cross-section having a width greater than its thickness, both the width and thickness being perpendicular to the longitudinal direction) or fiber shape (e.g., elongated cylinder or elongated bar with square cross-section having a width about the same as its thickness, both the width and thickness being perpendicular to the longitudinal direction).

Clause 26. The method of any one of clauses 21-25, wherein the embedded plurality of pressed, chemically-treated segments of bamboo is arranged within the base material as a regular pattern (e.g., 1-D, 2-D, or 3-D array of equal or variable spacing, or an interwoven arrangement), a random pattern, or any combination thereof.

Clause 27. The method of any one of clauses 21-26, further comprising, after the removing and prior to the pressing, infiltrating each of the chemically-treated segments with a polymer or a precursor of the polymer.

Clause 28. The method of clause 27, wherein the polymer comprises an epoxy resin, polyvinyl alcohol (PVA), polyethylene glycol (PEO), polyamide (PA), polyethylene terephthalate (PET), polybutylene terephthalate (PBT), polytrimethylene terephthalate (PTT), polyacrylonitrile (PAN), polycaprolactam (PA6), poly(m-phenylene isophthalamide) (PMIA), poly-p-phenylene terephthalamide (PPTA), polyurethane (PU), polycarbonate (PC), polypropylene (PP), high-density polyethylene (HDPE), polystyrene (PS), polycaprolactone (PCL), polybutylene succinate (PBS), polybutylene adipate terephthalate (PBAT), poly(butylene succinate-co-butylene adipate) (PBSA), polyhydroxybutyrate (PHB), poly(3-hydroxybutyrate-co-3-hydroxyvalerate) (PHBV), poly(glycolic acid) (PGA), polypyrrole (PPy), polythiophene (PTh), polyvinylidene fluoride (PVDF), polyvinyl fluoride (PVF), ethylene vinyl alcohol (EVOH), poly(vinylidene chloride) (PVDC), polyxylylene adipamide (MXD6), polyethylene (PE), polyvinyl chloride (PVC), poly(methyl methacrylate) (PMMA), acrylonitrile butadiene styrene (ABS), polyimide (PI), polyethylenimine (PEI), polylactic acid (PLA), octadecyltrichlorosilane (OTS), polyoctahedral silsesquioxane (POSS), paramethylstyrene (PMS), polydimethylsiloxane (PDMS), poly(ethylene naphthalate) (PEN), a graft copolymer of acrylonitrile-butadiene-styrene-methylmethacrylate (ABSM), dodecyltrimethoxysilane (DTMS), rosin, chitin, chitosan, protain, plant oil, lignin, hemicellulose, carboxymethyl cellulose, cellulose acetate, starch, agar, or any combination of the above.

Clause 29. The method of any one of clauses 21-28, further comprising, after the pressing and prior to the embedding, coating each of the chemically-treated segments with a hydrophobic polymer or a precursor of the hydrophobic polymer.

Clause 30. The method of any one of clauses 1-28, further comprising providing a coating on and/or in each chemically-treated segment, wherein the coating comprises boron nitride (BN), montmorillonite clay, hydrotalcite, silicon dioxide ($SiO_2$), sodium silicate, calcium carbonate ($CaCO_3$), aluminum hydroxide ($Al(OH)_3$), magnesium hydroxide ($Mg(OH)_2$), magnesium carbonate ($MgCO_3$), aluminum sulfate, iron sulfate, zinc borate, boric acid, borax, triphenyl phosphate (TPP), melamine, polyurethane, ammonium polyphosphate, phosphate, phosphite ester, ammonium phosphate, ammonium sulfate, phosphonate, diammonium phosphate (DAP), ammonium dihydrogen phosphate, monoammonium phosphate (MAP), guanylurea phosphate (GUP), guanidine dihydrogen phosphate, antimony pentoxide, or any combination of the above.

Clause 31. The method of any one of clauses 1-30, further comprising subjecting each chemically-treated segment to a hydrophobic treatment comprising epoxy resin, silicone oil, polyurethane, paraffin emulsion, acetic anhydride, octadecyltrichloro silane (OTS), 1H, 1H, 2H, 2H-perfluorodecyltriethoxysilane, fluoroesin, polydimethylsiloxane (PDMS), methacryloxymethyltrimethyl-silane (MSi), polyhedral oligomeric silsesquioxane (POSS), potassium methyl siliconate (PMS), dodecyl(trimethoxy) silane (DTMS), hexamethyldisiloxane, dimethyl diethoxy silane, tetraethoxysilane, methyltrichlorosilane, ethyltrimethoxysilane, methyl triethoxysilane, rimethylchlorosilane, phenyltrimethoxysilane, phenyltriethoxysilane, propyltrimethoxysilane, polymethyl methacrylate, polydiallyldimethylammonium chloride (polyDADMAC), 3-(trimethoxysilyl)propyl methacrylate (MPS, hydrophobic stearic acid, amphiphilic fluorinated triblock azide copolymers, polyvinylidene fluoride and fluorinated silane, n-dodecyltrimethoxysilane, sodium lauryl sulfate, or any combination of the above.

Clause 32. A structure formed by the method of any one of clauses 1-31.

Clause 33. A structure, comprising:
a segment comprising bamboo that has been chemically-treated to remove at least some naturally-occurring lignin therefrom.

Clause 34. The structure of any one of clauses 32-33, wherein an amount of lignin in the chemically-treated bamboo is less than 18 wt %, for example, less than 15 wt %, or even less than 10 wt %.

Clause 35. The structure of any one of clauses 32-34, wherein an amount of lignin in the chemically-treated bamboo of the segment is between 1% and 99.9% of an amount of lignin in the bamboo prior to any chemical treatment.

Clause 36. The structure of any one of clauses 32-35, wherein the chemically-treated bamboo of the segment has natural lumina therein that are at least partially collapsed.

Clause 37. The structure of any one of clauses 32-36, wherein the chemically-treated bamboo of the segment has natural lumina therein that are fully collapsed.

Clause 38. The structure of any one of clauses 32-35, wherein the chemically-treated bamboo of the segment has natural lumina therein that remain substantially open.

Clause 39. The structure of any one of clauses 32-35, wherein the chemically-treated bamboo of the segment has natural lumina therein filled with one or more polymers.

Clause 40. The structure of any one of clauses 32-39, wherein the segment comprises one or more non-native particles disposed on internal surfaces of the chemically-treated bamboo, external surfaces of the chemically-treated bamboo, or on both internal and external surfaces of the chemically-treated bamboo.

Clause 41. The structure of clause 40, wherein the one or more non-native particles comprise hydrophobic nanoparticles, for example, silica ($SiO_2$) nanoparticles, and/or fire-resistant nanoparticles, for example, boron-nitride (BN) nanoparticles.

Clause 42. The structure of any one of clauses 32-41, wherein the segment comprises one or more polymers infiltrated within the chemically-treated bamboo.

Clause 43. The structure of any one of clauses 39 and 42, wherein the one or more polymers comprise an epoxy resin, polyvinyl alcohol (PVA), polyethylene glycol (PEO), polyamide (PA), polyethylene terephthalate (PET), polybutylene terephthalate (PBT), polytrimethylene terephthalate (PTT), polyacrylonitrile (PAN), polycaprolactam (PA6), poly(m-phenylene isophthalamide) (PMIA), poly-p-phenylene terephthalamide (PPTA), polyurethane (PU), polycarbonate (PC), polypropylene (PP), high-density polyethylene (HDPE), polystyrene (PS), polycaprolactone (PCL), polybutylene succinate (PBS), polybutylene adipate terephthalate (PBAT), poly(butylene succinate-co-butylene adipate) (PBSA), polyhydroxybutyrate (PHB), poly(3-hydroxybutyrate-co-3-hydroxyvalerate) (PHBV), poly (glycolic acid) (PGA), polypyrrole (PPy), polythiophene (PTh), polyvinylidene fluoride (PVDF), polyvinyl fluoride (PVF), ethylene vinyl alcohol (EVOH), poly(vinylidene chloride) (PVDC), polyxylylene adipamide (MXD6), polyethylene (PE), polyvinyl chloride (PVC), poly(methyl methacrylate) (PMMA), acrylonitrile butadiene styrene (ABS), polyimide (PI), polyethylenimine (PEI), polylactic acid (PLA), octadecyltrichlorosilane (OTS), polyoctahedral silsesquioxane (POSS), paramethylstyrene (PMS), polydimethylsiloxane (PDMS), poly(ethylene naphthalate) (PEN), a graft copolymer of acrylonitrile-butadiene-styrene-methylmethacrylate (ABSM), dodecyltrimethoxysilane (DTMS), rosin, chitin, chitosan, protain, plant oil, lignin, hemicellulose, carboxymethyle cellulose, cellulose acetate, starch, agar, or any combination of the above.

Clause 44. The structure of any one of clauses 32-43, wherein the segment has a shape of a cylinder, flat sheet, rectangular block, stick, elongated strip, or any combination of the above, or an irregular shape.

Clause 45. The structure of any one of clauses 32-44, wherein the segment has a shape of a wire, rope, or fiber formed by twisting the chemically-treated bamboo about an axis substantially parallel to its longitudinal direction.

Clause 46. A structure, comprising:
a base material; and
a plurality of segments embedded within the base material, each segment comprising bamboo that has been chemically-treated to remove at least some naturally-occurring lignin therefrom and having natural lumina therein that are at least partially collapsed.

Clause 47. The structure of clause 46, wherein the base material comprises concrete or a polymer.

Clause 48. The structure of clause 47, wherein the polymer comprises an epoxy resin, polyvinyl alcohol (PVA), polyethylene glycol (PEO), polyamide (PA), polyethylene terephthalate (PET), polybutylene terephthalate (PBT), polytrimethylene terephthalate (PTT), polyacrylonitrile (PAN), polycaprolactam (PA6), poly (m-phenylene isophthalamide) (PMIA), poly-p-phenylene terephthalamide (PPTA), polyurethane (PU), polycarbonate (PC), polypropylene (PP), high-density polyethylene (HDPE), polystyrene (PS), polycaprolactone (PCL), polybutylene succinate (PBS), polybutylene adipate terephthalate (PBAT), poly(butylene succinate-co-butylene adipate) (PBSA), polyhydroxybutyrate (PHB), poly(3-hydroxybutyrate-co-3-hydroxyvalerate) (PHBV), poly(glycolic acid) (PGA), polypyrrole (PPy), polythiophene (PTh), polyvinylidene fluoride (PVDF), polyvinyl fluoride (PVF), ethylene vinyl alcohol (EVOH), poly(vinylidene chloride) (PVDC), polyxylylene adipamide (MXD6), polyethylene (PE), polyvinyl chloride (PVC), poly(methyl methacrylate) (PMMA), acrylonitrile butadiene styrene (ABS), polyimide (PI), polyethylenimine (PEI), polylactic acid (PLA), octadecyltrichlorosilane (OTS), polyoctahedral silsesquioxane (POSS), paramethylstyrene (PMS), polydimethylsiloxane (PDMS), poly(ethylene naphthalate) (PEN), a graft copolymer of acrylonitrile-butadiene-styrene-methylmethacrylate (ABSM), dodecyltrimethoxysilane (DTMS), rosin, chitin, chitosan, protain, plant oil, lignin, hemicellulose, carboxymethyl cellulose, cellulose acetate, starch, agar, or any combination of the above.

Clause 49. The structure of any one of clauses 47-48, wherein the concrete comprises fly ash, blast furnace slag, waste paper, glass, plastic waste, rice husk ash, corn cob ash, sawdust ash, fly ash, palm oil fuel ash, silica fume (or microsilica), or any combination thereof.

Clause 50. The structure of any one of clauses 46-49, wherein each segment has a strip shape (e.g., elongated bar with rectangular cross-section having a width greater than its thickness, both the width and thickness being perpendicular to the longitudinal direction) or fiber shape (e.g., elongated cylinder or elongated bar with square cross-section having a width about the same as its thickness, both the width and thickness being perpendicular to the longitudinal direction).

Clause 51. The structure of any one of clauses 46-50, wherein the embedded plurality of segments is arranged within the base material in a regular pattern (e.g., 1-D, 2-D, or 3-D array of equal or variable spacing, or an interwoven arrangement), a random pattern, or any combination thereof.

Clause 52. The structure of any one of clauses 46-51, wherein each of the plurality of segments comprises a polymer infiltrated within the chemically-treated bamboo.

Clause 53. The structure of any one of clauses 46-52, wherein each of the plurality of segments comprises a hydrophobic polymer coating on the chemically-treated bamboo.

Clause 54. The structure of any one of clauses 32-53, wherein each segment comprise a coating on and/or therein, wherein the coating comprises boron nitride (BN), montmorillonite clay, hydrotalcite, silicon dioxide ($SiO_2$), sodium silicate, calcium carbonate ($CaCO_3$), aluminum hydroxide ($Al(OH)_3$), magnesium hydroxide ($Mg(OH)_2$), magnesium carbonate ($MgCO_3$), aluminum sulfate, iron sulfate, zinc borate, boric acid, borax, triphenyl phosphate (TPP), melamine, polyurethane, ammonium polyphosphate, phosphate, phosphite ester, ammonium phosphate, ammonium sulfate, phosphonate, diammonium phosphate (DAP), ammonium dihydrogen phosphate, monoammonium phosphate (MAP), guanylurea phosphate (GUP), guanidine dihydrogen phosphate, antimony pentoxide, or any combination of the above.

CONCLUSION

Any of the features illustrated or described with respect to FIGS. 2-18D, Examples 1-13, and Clauses 1-54 can be combined with any other of FIGS. 2-18D, Examples 1-13, and Clauses 1-54 to provide structures, methods, and embodiments not otherwise illustrated or specifically described herein. In view of the many possible embodiments to which the principles of the disclosed technology may be applied, it should be recognized that the illustrated embodiments are only preferred examples and should not be taken as limiting the scope of the disclosed technology. Rather, the scope is defined by the following claims. We therefore claim all that comes within the scope of these claims.

The invention claimed is:
1. A method comprising:
subjecting a plurality of segments of bamboo to one or more via one or more chemical treatments so as to remove at least some but no more than 90% of lignin from the plurality of segments of bamboo;
after the subjecting, compressing each chemically-treated segment of bamboo by pressing in a direction crossing a longitudinal direction of the respective segment, such that (i) natural lumina originally in the respective segment at least partially collapse, (ii) a density of each compressed, chemically-treated segment after the compressing is greater than that of the respective segment before the subjecting, and (iii) a thickness of each compressed, chemically-treated segment is no more than 40% of a thickness of the respective segment before the subjecting; and embedding the plurality of compressed, chemically-treated segments of bamboo within a base material to form a composite.

2. The method of claim 1, wherein the base material comprises concrete.

3. The method of claim 1, further comprising, after the subjecting and prior to the compressing, infiltrating each of the chemically-treated segments with a polymer or a precursor of the polymer.

4. The method of claim 1, further comprising, after the compressing and prior to the embedding, coating each of the compressed, chemically-treated segments with a hydrophobic polymer or a precursor of the hydrophobic polymer.

5. The method of claim 1, wherein the base material comprises a polymer.

6. The method of claim 1, wherein the subjecting to one or more chemical treatments comprise immersing the plurality of segments in a solution of sodium hydroxide (NaOH), lithium hydroxide (LiOH), potassium hydroxide (KOH), sodium sulfite ($Na_2SO_3$), sodium sulfate ($Na_2SO_4$), sodium sulfide ($Na_2S$), $Na_nS$ wherein n is an integer, urea ($CH_4N_2O$), sodium bisulfite ($NaHSO_3$), sulfur dioxide ($SO_2$), anthraquinone ($C_{14}H_8O_2$), methanol ($CH_3OH$), ethanol ($C_2H_5OH$), butanol ($C_4H_9OH$), formic acid ($CH_2O_2$), hydrogen peroxide ($H_2O_2$), acetic acid ($CH_3COOH$), butyric acid ($C_4H_8O_2$), peroxyformic acid ($CH_2O_3$), peroxyacetic acid ($C_2H_4O_3$), ammonia ($NH_3$), tosylic acid (p-TsOH), sodium hypochlorite (NaClO), sodium chlorite ($NaClO_2$), chlorine dioxide ($C_1O_2$), chorine ($Cl_2$), or any combination of the above.

7. The method of claim 1, further comprising, after the subjecting, modifying the chemically-treated segments of bamboo by:
forming or depositing non-native particles on internal surfaces of the plurality of segments, external surfaces of the segments, or on both internal and external surfaces of the segments,
wherein the non-native particles comprise hydrophobic nanoparticles.

8. The method of claim 1, wherein, for each segment of the plurality of segments of bamboo:
the pressing is performed with the respective segment at a temperature between 20° C. and 140° C., inclusive, and subject to a pressure between 0.5 MPa and 10 MPa, inclusive, for 1-180 minutes, inclusive.

9. The method of claim 1, further comprising, after the compressing and prior to the embedding, arranging the plurality of compressed, chemically-treated segments of bamboo to form a woven pattern.

10. The method of claim 1, further comprising, after the compressing and prior to the embedding, arranging the plurality of compressed, chemically-treated segments of bamboo in parallel.

11. The method of claim 1, wherein, after the subjecting, each of the plurality of chemically-treated segments of bamboo has a lignin content less than or equal to 18 wt %.

12. The method of claim 1, further comprising, after the subjecting and prior to the compressing, drying each of the plurality of the chemically-treated segments of bamboo of bamboo via a microwave drying process.

13. The method of claim 1, wherein:
the thickness of each compressed, chemically-treated segment is in a range of 20-30% of the thickness of the respective segment before the subjecting; or the density of each compressed, chemically-treated segment is at least 1 $g/cm^3$.

14. The method of claim 1, wherein, further comprising:
after the subjecting and prior to the compressing, infiltrating each of the chemically-treated segments of bamboo with rosin, and
after the compressing and prior to the embedding, a concentration of rosin in each of the plurality of the compressed, chemically-treated segments of bamboo is about 20 wt %.

15. The method of claim 3, wherein the polymer comprises an epoxy resin, polyvinyl alcohol (PVA), polyethylene glycol (PEO), polyamide (PA), polyethylene terephthalate (PET), polybutylene terephthalate (PBT), polytrimethylene terephthalate (PTT), polyacrylonitrile (PAN), polycaprolactam (PA6), poly(m-phenylene isophthalamide) (PMIA), poly-p-phenylene terephthalamide (PPTA), polyurethane (PU), polycarbonate (PC), polypropylene (PP), high-density polyethylene (HDPE), polystyrene (PS), polycaprolactone (PCL), polybutylene succinate (PBS), polybutylene adipate terephthalate (PBAT), poly (butylene succinate-co-butylene adipate) (PBSA), polyhydroxybutyrate (PHB), poly(3-hydroxybutyrate-co-3-hydroxyvalerate) (PHBV), poly(glycolic acid) (PGA), polypyrrole (PPy), polythiophene (PTh), polyvinylidene fluoride (PVDF), polyvinyl fluoride (PVF), ethylene vinyl alcohol (EVOH), poly(vinylidene chloride) (PVDC), polyxylylene adipamide (MXD6), polyethylene (PE), polyvinyl chloride (PVC), poly(methyl methacrylate) (PMMA), acrylonitrile butadiene styrene (ABS), polyimide (PI), polyethylenimine (PEI), polylactic acid (PLA), octadecyltrichlorosilane (OTS), polyoctahedral silsesquioxane (POSS), paramethylstyrene (PMS), polydimethylsiloxane (PDMS), poly(ethylene naphthalate) (PEN), a graft copolymer of acrylonitrile-butadiene-styrene-methylmethacrylate (ABSM), dodecyltrimethoxysilane (DTMS), rosin, chitin, chitosan, protein, plant oil, lignin, hemicellulose, carboxymethyl cellulose, cellulose acetate, starch, agar, or any combination of the above.

16. The method of claim 6, wherein the subjecting to one or more chemical treatments comprises immersing the plurality of segments in a boiling solution of NaOH and $Na_2SO_3$.

17. The method of claim 16, wherein the subjecting to one or more chemical treatments further comprises immersing the plurality of segments of bamboo in a second solution of $H_2O_2$ after the immersing in the boiling solution.

18. A method comprising:
mechanically processing a natural bamboo section to form a plurality of segments of bamboo, the mechanically processing comprising:
cutting a slit in the natural bamboo section, the slit extending along a longitudinal direction of the natural bamboo section;
softening the natural bamboo section by exposing to steam;
flattening the natural bamboo section by horizontal pressing or cold rolling; and
cutting the flattened bamboo section into the plurality of segments of bamboo;
after the mechanically processing, removing at least some lignin from a plurality of segments of bamboo via one or more chemical treatments;
pressing each chemically-treated segment of bamboo in a direction crossing a longitudinal direction of the respective segment, such that natural lumina originally in the respective segment at least partially collapse; and embedding the plurality of pressed, chemically-treated segments of bamboo within a base material to form a composite.

19. A method comprising:

removing at least some lignin from a plurality of segments of bamboo via one or more chemical treatments;

pressing each chemically-treated segment of bamboo in a direction crossing a longitudinal direction of the respective segment, such that natural lumina originally in the respective segment at least partially collapse; and embedding the plurality of pressed, chemically-treated segments of bamboo within a base material to form a composite, wherein the embedding comprises subjecting the base material with the plurality of pressed, chemically-treated segments of bamboo therein to further pressing.

20. The method of claim 19, wherein the further pressing is at a pressure of 5 MPa and a temperature of 100° C.

\* \* \* \* \*